United States Patent [19]

Barabash et al.

[11] Patent Number: 5,241,652
[45] Date of Patent: Aug. 31, 1993

[54] SYSTEM FOR PERFORMING RULE PARTITIONING IN A RETE NETWORK

[75] Inventors: William Barabash, Acton; William S. Yerazunis, Hudson, both of Mass.

[73] Assignee: Digital Equipment Corporation, Maynard, Mass.

[21] Appl. No.: 863,351

[22] Filed: Mar. 31, 1992

Related U.S. Application Data

[63] Continuation of Ser. No. 364,020, Jun. 8, 1989, abandoned.

[51] Int. Cl.⁵ .............................................. G06F 15/18
[52] U.S. Cl. ........................................ 395/64; 395/11
[58] Field of Search .................... 395/64, 11; 364/200

[56] References Cited

U.S. PATENT DOCUMENTS

| | | | |
|---|---|---|---|
| 4,752,890 | 6/1988 | Natarajan et al. | 364/513 |
| 4,761,746 | 8/1988 | Tano et al. | 364/513 |
| 4,837,735 | 6/1989 | Allen, Jr. et al. | 364/200 |
| 4,849,905 | 7/1989 | Loeb et al. | 364/200 |
| 4,884,217 | 11/1989 | Skeirik et al. | 364/513 |
| 4,924,908 | 5/1990 | Highland | 364/513 |
| 4,937,760 | 6/1990 | Beitel et al. | 364/200 |
| 4,956,791 | 9/1990 | Lee et al. | 364/513 |

FOREIGN PATENT DOCUMENTS

| | | |
|---|---|---|
| 61-128358 | 6/1986 | Japan . |
| 182226 | 3/1989 | Japan . |
| 182227 | 3/1989 | Japan . |

OTHER PUBLICATIONS

"Partitioning in parallel processing of production systems", of Lazer et al., Int. Conf. on Parallel Processing, Aug. 21-24, 1984, 92-100.

Moldovan, D. Z., "Rubic: A Multiprocessor for Rule--Based Systems", *IEEE Trans. on Systems Man and Cybernetics*, V. 19, N. 4, Jul./Aug. 1989.

Wah; B. W. et al., "A Survey on the Design of Multiprocessing Systems for Artificial Intelligence Applications", *IEEE Trans. on Sys. & Cyb.* V. 19 N.4, Jul/Aug. 1989.

Hamacher et al., Computer Organization, McGraw-Hill, Inc., 1984, 346-352.

C. L. Forgy, "Rete: A Fast Algorithm for the Many Pattern/Many Object Pattern Match Problem", Artificial Intelligence, Vol. 19, 1982, pp. 17-37.

W. D. Hillis et al., "Data Parallel Algorithms", Communications of the ACM, vol. 29, No. 12, Dec., 1986, pp. 1170-1183.

U.S. application Ser. No. 103,364, by W. S. Barabas et al., entitled "Method for Operating A Parallel Processing System and Related Apparatus".

A. Gupta et al., *High-Speed Implementations of Rule--Based Systems*, 7 ACM Transactions on Computer Systems 119-146 (No. 2, May 1989).

P. L. Butler et al., *Parallel Architecture for OPS5*, 15th Annual International Symposium on Computer Architecture 452-457 (May 1988).

C. Lee and J. Massey, *Multiprocessor Scheduling: An Extension of Multifit Algorithm*, 9287 Journal of Manufacturing Systems 25-32 (No. 1, 1988).

A. Sabharwal et al., *Parallelism in Rule-Based Systems*, 937 SPIE Applications of Artificial Intelligence VI 360-372 (1988).

*Primary Examiner*—Michael R. Fleming
*Assistant Examiner*—Robert W. Downs
*Attorney, Agent, or Firm*—Kenyon & Kenyon

[57] ABSTRACT

A rule-partitioning system for converting at least a portion of a target expert system program to a rule partitioned RETE network for execution on multiple processors, including a rule partitioning portion for assigning different rules of the target expert system program to different partitions on the basis of previously collected processing statistics and on the use of node sharing; and a compiler for converting the target expert system program to the RETE network, wherein the rules of the RETE network are assigned to the multiple processors in accordance with the partition assignments.

46 Claims, 17 Drawing Sheets

FIG. 3C-1

BETA PARTITIONING OPINION RULES ①

```
RULE H1:   IF
              CONTEXT      BETA_HEURISTICS = ACTIVE
           <THE_NODE> NODE RULE_ID = <PR>
                           NODE TYPE = NOT
                           FLAG T1 = EMPTY
           THEN
              MODIFY       <THE_NODE>
                           OPINION = -1000
                           FLAG T1 = SET

RULE H2:   IF
              CONTEXT      BETA_HEURISTICS = ACTIVE
           <THE_NODE> NODE RULE_ID = <PR>
                           NODE NUM = 1
                           L/R SIDE = L
                           FLAG T9 = CLEAR
           THEN
              MODIFY       <THE_NODE>
                           OPINION = OPINION-1
                           FLAG T9 = SET
```

FIG. 3C-2

BETA PARTITIONING OPINION RULES ②

```
RULE H3:   IF
             CONTEXT       BETA_HEURISTICS = ACTIVE
   <THE_NODE> NODE         RULE ID = <PR>
                           NODE NUM = <NN>
                           L/R SIDE = <LR>
                           NODE TYPE = AND
                           FLAG T2 = CLEAR
              NODE         RULE ID = <PR>
                           NODE NUM = <NN>
                           L/R SIDE ≠ <LR>
                           MAX COMPS > PARAM<GOOD_MAX_COMPS>
           THEN
             MODIFY   <THE_NODE>
                           OPINION = OPINION+7
                           FLAG T2 = SET

RULE H4:   IF
             CONTEXT       BETA_HEURISTICS = ACTIVE
   <THE_NODE> NODE         RULE ID = <PR>
                           NODE NUM = <NN>
                           L/R SIDE = R
                           NODE TYPE = AND
                           MAX COMPS > PARAM<GOOD_MAX_COMPS>
                           FLAG T8 = CLEAR
   <A_PARENT> NODE         RULE ID = <PR>
                           NODE NUM = <NN>-1
                           L/R SIDE = <LR>
                           MAX COMPS = <M_COMP>
   <OTHER_PARENT> NODE     RULE ID = <PR>
                           NODE NUM = <NN>-1
                           L/R SIDE ≠ <LR>
                           MAX COMPS ≥ M_COMP
           THEN
             MODIFY   <THE_NODE>
                           FLAG T8 = SET
                      <OTHER_PARENT>
                           OPINION = OPINION+5
```

FIG. 3C-3
BETA PARTITIONING OPINION RULES ③

```
RULE H5:  IF
            CONTEXT     BETA_HEURISTICS = ACTIVE
          <THE_NODE> NODE  RULE_ID = <PR>
                      MAX COMPS < PARAM<BAD_MAX_COMPS>
                      FLAG T3 = CLEAR
          THEN
            MODIFY    <THE_NODE>
                      OPINION = OPINION-4
                      FLAG T3 = SET

RULE H6:  IF
            CONTEXT     BETA_HEURISTICS = ACTIVE
          <THE_NODE> NODE  RULE_ID = <PR>
                      NODE TYPE = AND
                      MAX EMIT > PARAM<GOOD_MAX_EMIT>
                      FLAG T4 = CLEAR
          THEN
            MODIFY    <THE_NODE>
                      OPINION = OPINION+5
                      FLAG T4 = SET

RULE H7:  IF
            CONTEXT     BETA_HEURISTICS = ACTIVE
          <THE_NODE> NODE  RULE_ID = <PR>
                      NODE NUM = <NN>
                      L/R SIDE = L
                      MAX ACTIV > PARAM<GOOD_MAX_ACTIV>
                      OPINION = <OP>
                      FLAG T5 = CLEAR
          <L_PARENT> NODE  RULE_ID = <PR>
                      NODE NUM = <NN>-1
                      L/R SIDE = L
                      OPINION = <OPL>
          <R_PARENT> NODE  RULE_ID = <PR>
                      NODE NUM = <NN>-1
                      OPINION = <OPR>
                      L/R SIDE = R
          THEN
            MODIFIY   <THE_NODE>
                      OPINION = <OP>+3
                      FLAG T5 = SET
                      <L_PARENT>
                      OPINION = <OPL>+2
                      <R_PARENT>
                      OPINION = <OPR>+2
```

FIG. 3C-4

BETA PARTITIONING OPINION RULES ④

```
RULE H8:    IF
              CONTEXT     BETA_HEURISTICS = ACTIVE
            <THE_NODE> NODE  RULE ID = <PR>
                          L/R SIDE = R
                          NODE TYPE = AND
                          MAX ACTIV > PARAM<GOOD_MAX_ACTIV>
                          FLAG T10 = CLEAR
            THEN
              MODIFY      <THE_NODE>
                          OPINION = OPINION+4
                          FLAG T10 = SET

RULE H9:    IF
              CONTEXT     BETA_HEURISTICS = ACTIVE
            <THE_NODE> NODE  RULE ID = <PR>
                          NODE TYPE = AND
                          TOT EMIT > PARAM<GOOD_TOT_EMIT>
                          FLAG T6 = CLEAR
            THEN
              MODIFY      <THE_NODE>
                          OPINION = OPINION+2
                          FLAG T6 = SET

RULE H10:   IF
              CONTEXT     BETA_HEURISTICS = ACTIVE
            <THE_NODE> NODE  RULE ID = <PR>
                          NODE NUM = <NN>
                          L/R SIDE = <LR>
                          NODE TYPE = AND
                          FLAG T7 = CLEAR
            <SIBLING_NODE> NODE  RULE ID = <PR>
                          NODE NUM = <NN>
                          L/R SIDE ≠ <LR>
                          TOT COMPS > PARAM<GOOD_TOT_COMPS>
            THEN
              MODIFY      <THE_NODE>
                          OPINION = OPINION+4
                          FLAG T7 = SET
```

FIG. 3C-5

BETA PARTITIONING OPINION RULES ⑤

```
RULE H11:    IF
             CONTEXT    BETA_HEURISTICS = ACTIVE
<THE_NODE>   NODE       RULE_ID = <PR>
                        NODE TYPE = AND
                        MAX TIME > PARAM<GOOD_MAX_TIME>
                        FLAG T11 = CLEAR
             THEN
             MODIFY     <THE_NODE>
                        OPINION = OPINION+4
                        FLAG T11 = SET

RULE H12:    IF
             CONTEXT    BETA_HEURISTICS = ACTIVE
<THE_NODE>   NODE       RULE_ID = <PR>
                        NODE TYPE = AND
                        TOT TIME > PARAM<GOOD_TOT_TIME>
                        FLAG T12 = CLEAR
             THEN
             MODIFY     <THE_NODE>
                        OPINION = OPINION+3
                        FLAG T12 = SET

RULE H13:    IF
             CONTEXT    BETA_HEURISTICS = ACTIVE
<THE_NODE>   NODE       RULE_ID = <PR>
                        NODE TYPE = AND
                        TOT ACTIV >> TOT EMIT
             THEN
             MODIFY     <THE_NODE>
                        OPINION = OPINION-1
                        FLAG T13 = SET
```

FIG. 3D-1

BETA DECISIONS (1)

```
RULE D1:   IF
              CONTEXT    MAKE_BETA_DECISIONS = ACTIVE
   <THE_NODE> NODE       RULE ID = <PR>
                         NODE NUM = 1
                         L/R SIDE = <PR>
              <OP>       OPINION > PARAM<GOOD_BETA_CONST>
                         DECISION = <EMPTY>
              NODE       RULE ID = <PR>
                         NODE NUM = 1
                         L/R SIDE ≠ <LR>
                         OPINION < <OP>
              NODE       RULE ID = <PR>
                         NODE NUM = 2
                         L/R SIDE = <LR2>
                         OPINION<LOP> + PARAM<GOOD_BETA_DELTA>
              NODE       RULE ID = <PR>
                         NODE NUM = 2
                         L/R SIDE ≠ <LR2>
                         OPINION<LOP> + PARAM<GOOD_BETA_DELTA>
           THEN
              MODIFY     <THE_NODE>
                         DECISION = BETA_PART_HERE
              MAKE       RULE
                         RULE ID = <PR>
                         PARTITION TYPE = BETA
                         LEVEL = 1
                         L/R SIDE = <LR>
                         OPINION = <OP>
```

FIG. 3D-2

BETA DECISIONS (2)

```
RULE D2:   IF
             CONTEXT       MAKE_BETA_DECISIONS = ACTIVE
           <THE_NODE> NODE RULE ID = <PR>
                           NODE NUM = 1
                           L/R SIDE = <LR>
                   <OP>    OPINION > PARAM<GOOD_BETA_CONST>
                           DECISION = EMPTY
                   NODE    RULE ID = <PR>
                           NODE NUM = 1
                           L/R SIDE ≠ <LR>
                           OPINION < <OP>
             NOT NODE      RULE ID = <PR>
                           NODE NUM = 2
                   NODE    RULE ID = <EOF>
                           NODE NUM = <EOF>
           THEN
             MODIFY   <THE_NODE>
                      DECISION = BETA_PART_HERE
             MAKE     RULE
                      RULE ID = <PR>
                      PARTITION TYPE = BETA
                      LEVEL = 1
                      L/R SIDE = <LR>
                      OPINION = <OP>

RULE D3:   IF
             CONTEXT       MAKE_BETA_DECISIONS = ACTIVE
           <THE_NODE> NODE RULE ID = <PR>
                           OPINION < PARAM<GOOD_BETA_CONST>
                           DECISION = EMPTY
           THEN
             MODIFY   <THE_NODE>
                      DECISION = NO
```

FIG. 3D-3

BETA DECISIONS ③

```
RULE D4:    IF
              CONTEXT        MAKE_BETA_DECISIONS = ACTIVE
    <THE_NODE> NODE          RULE ID = <PR>
                             NODE NUM = <NN>
              <OP>           OPINION > PARAM<GOOD_BETA_CONST>
                             DECISION = EMPTY
              NODE           RULE ID = <PR>
                             NODE NUM = <NN>+1
                             OPINION > <OP> + PARAM<GOOD_BETA_DELTA>
            THEN
              MODIFY         <THE_NODE>
                             DECISION = NO

RULE D5:    IF
              CONTEXT        MAKE_BETA_DECISIONS = ACTIVE
    <THE_NODE> NODE          RULE ID = <PR>
                             NODE NUM = <NN>
                             L/R SIDE = <LR>
              <OP>           OPINION > PARAM<GOOD_BETA_CONST>
                             DECISION = EMPTY
    <SIBLING_NODE> NODE      RULE ID = <PR>
                             NODE NUM = <NN>
                             L/R SIDE ≠ <LR>
              <OP2>          OPINION < <OP>
              NODE           RULE ID = <PR>
                             NODE NUM = <NN>-1
                             DECISION = NO
                             L/R SIDE = L
              NODE           RULE ID = <PR>
                             NODE NUM = <NN>-1
                             DECISION = NO
                             L/R SIDE = R
              NOT NODE       RULE ID = <PR>
                             NODE NUM = <NN>+1
              NODE           RULE ID = EOF
                             NODE NUM = EOF
            THEN
              MODIFY         <THE_NODE>
                             DECISION = BETA
              MAKE           RULE
                             RULE ID = <PR>
                             PARTITION TYPE = BETA_PART_HERE
                             LEVEL = <NN>
                             L/R SIDE = <LR>
                             OPINION = <OP>
              MAKE           CONTEXT FLUSH_ALL_NODES = ACTIVE
```

FIG. 3D-4

BETA DECISIONS ④

```
RULE 06:   IF
             CONTEXT    MAKE_BETA_DECISIONS = ACTIVE
<THE_NODE> NODE         RULE ID = <PR>
                        NODE NUM = <NN>
                        L/R SIDE = <LR>
           <OP>         OPINION > PARAM<GOOD_BETA_CONST>
                        DECISION = EMPTY
           NODE         RULE ID = <PR>
                        NODE NUM = <NN>
                        L/R SIDE ≠ <LR>
                        OPINION < <OP>
           NODE         RULE ID = <PR>
                        NODE NUM = <NN>-1
                        L/R SIDE = L
                        DECISION = NO
           NODE         RULE ID = <PR>
                        NODE NUM = <NN>-1
                        L/R SIDE = R
                        DECISION = NO
           NODE         RULE ID = <PR>
                        NODE NUM = <NN>+1
                        L/R SIDE = L
                        OPINION<LOP> + PARAM<GOOD_BETA_DELTA>
           NODE         RULE ID = <PR>
                        NODE NUM = <NN>+1
                        L/R SIDE = R
                        OPINION<LOP> + PARAM<GOOD_BETA_DELTA>
           THEN
           MODIFY     <THE_NODE>
                      DECISION = BETA
           MAKE       RULE
                      RULE ID = <PR>
                      PARTITION TYPE = BETA_PART_HERE
                      LEVEL = <NN>
                      L/R SIDE = <LR>
                      OPINION = <OP>
           MAKE       CONTEXT FLUSH_ALL_NODES = ACTIVE
```

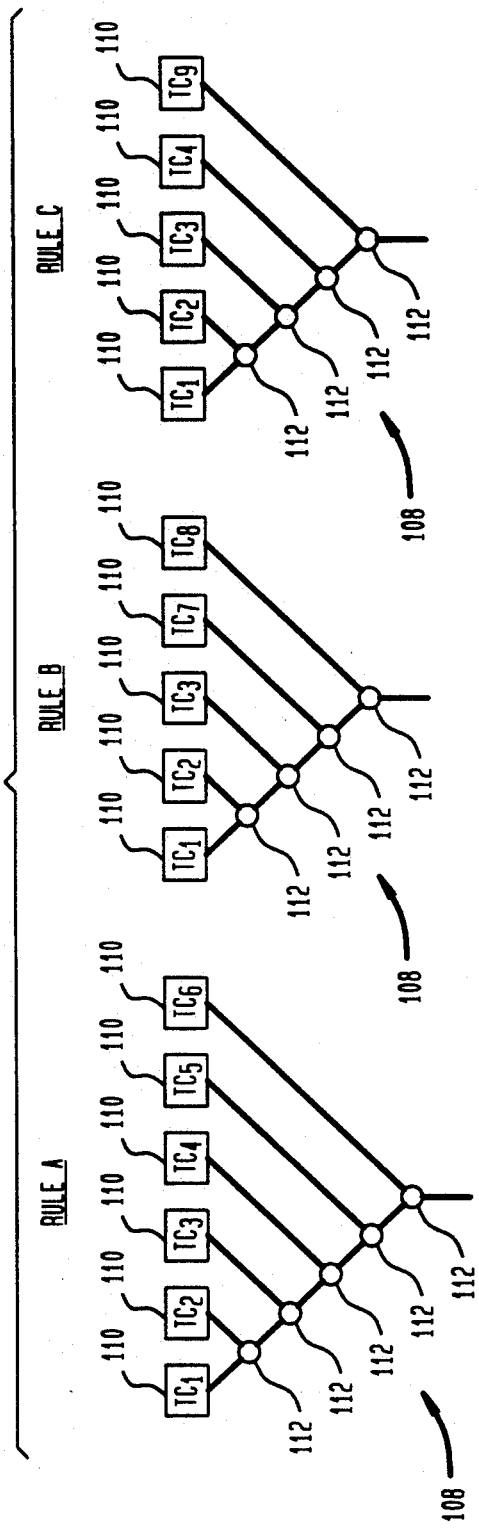
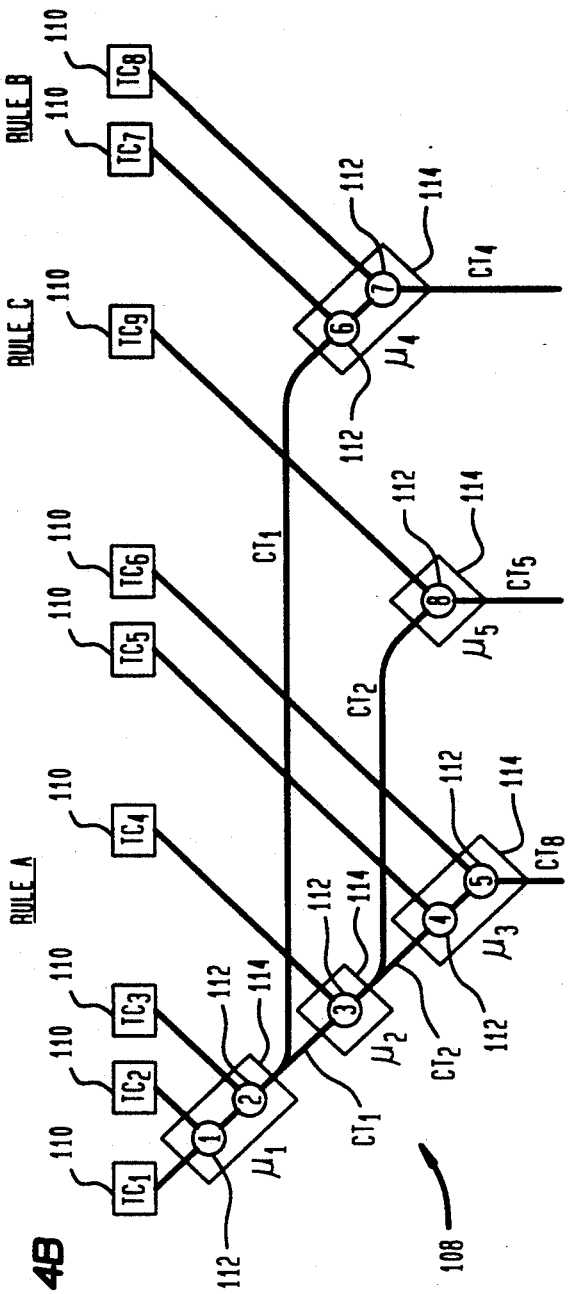
FIG. 4A
FIG. 4B

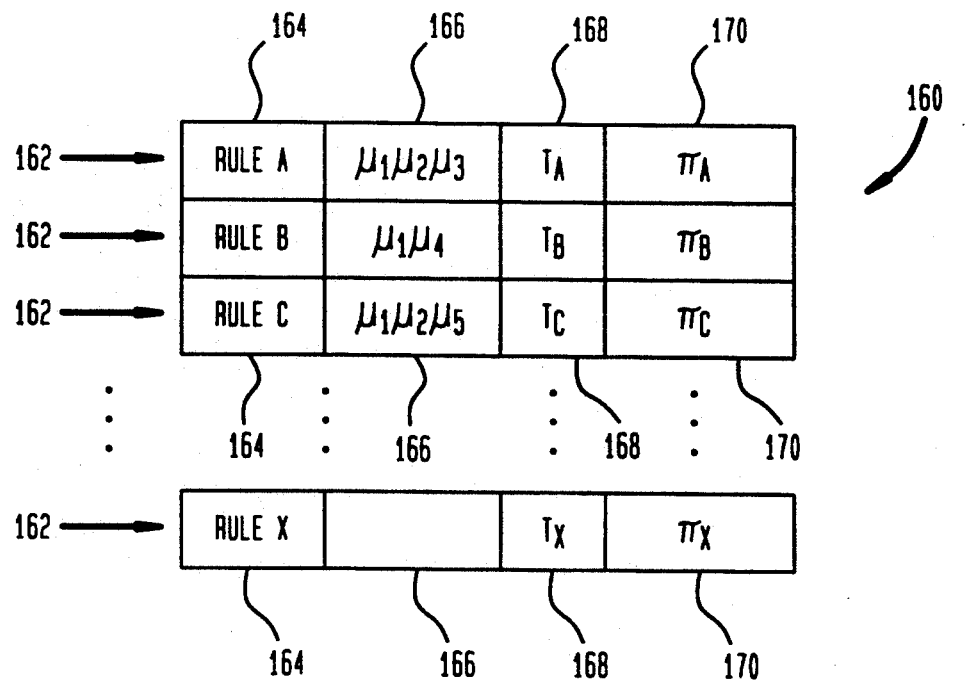

SYSTEM FOR PERFORMING RULE PARTITIONING IN A RETE NETWORK

This is a continuation of application Ser. No. 364,020 filed on Jun. 8, 1989 now abandoned.

INCORPORATION BY REFERENCE

U.S. patent application Ser. No. 103,364, filed Sep. 30, 1987, in the names of William Barabash and William S. Yerazunis, for Method For Operating A Parallel Processing System And Related Apparatus, now U.S. Pat. No. 4,965,882, expressly incorporated herein by reference.

FIELD OF THE INVENTION

The invention relates generally to the field of artificial intelligence systems, and more particularly to rule-based systems in which various conditions defined by the rules are processed in the form of reticular networks to facilitate efficient identification of the rules in condition for firing.

BACKGROUND OF THE INVENTION

Rule-based artificial intelligence systems, generally known as expert systems, typically include a set of rules, forming a "knowledge base", one or more facts in a working memory, and an inference engine that manipulates the rules in response to the facts in the working memory. By a process known as "inference", the inference engine attempts to match conditions in each of the rules to the facts in the working memory. If the conditions of a particular rule match the facts, the rule is said to "fire", and the inference engine then performs actions or operations specified in the rule. These operations may include, for example, addition, deletion and/or modification of facts in the working memory, transmission of results to a user, and so forth. The condition matching/firing sequence is sometimes referred to as a "recognize/act" cycle, with "recognize" referring to the portion of the operation in which the inference engine compares conditions of the rules to the facts in working memory to determine which, if any, rules fire, and "act" referring to the portion of the operation in which the inference engine actually performs the actions and operations specified in the rule. If, during firing of a rule, the inference engine adds, deletes or modifies a fact, the inference engine may repeat these operations in response to the new or modified facts in the working memory, which may, in turn, cause other rules to fire. Rule processing begins when an addition, modification or deletion is made to the facts in the working memory, and proceeds iteratively until no further additions, modifications or deletions are made to the facts in the working memory.

More particularly, each rule includes one or more conditions, which are collectively referred to as the "left-hand side", and a "right-hand side" which contains an action list, which identifies one or more operations performed if the rule fires. The facts in the working memory are typically organized as one or more relations, with each relation comprising one or more entries, or items of data. Each entry in a relation, in turn, is identified as having one or more slots. Each relation is identified by a class name, and each slot is identified by a slot name. A condition identifies a relation by class name, one or more slots, by name, and, optionally, a set of limits or requirements on the values for each named slot. In the comparison operation, the inference engine determines whether the relation in the working memory that corresponds to the class name in the condition contains an entry whose slot values correspond to the slot values set forth in the condition. If so, the condition is satisfied. However, if the working memory does not have an entry whose slots contain the values specified in the condition, the condition is not satisfied. To determine whether a rule is in condition to fire, the inference engine performs the existence test in connection with each condition in the rule.

The existence test can be somewhat more complicated, particularly in connection with a rule in which one or more of a condition's slot values are expressed as variable values. If a condition identifies a class and one or more slot values, at least one of which is specified by a variable and the values identified for each of the other slot names match the values in their corresponding slots in the working memory entry, the condition is satisfied by each entry in the relation identified by the class name in which the variable is satisfied. In the match operation for a condition with a variable, the inference engine establishes one or more binding lists for the variables that identify the set of values in the slots in the various entries in the relation which can satisfy the condition. The values of the variables in each binding list are propagated through subsequent conditions comprising the rule's left hand side to determine whether each successive condition is satisfied, with each set of values comprising the binding lists that satisfy the rule resulting in a different instantiation of the rule. The inference engine may then perform a conflict resolution operation among the rules and instantiations to select a rule, and specifically an instantiation if the rule has multiple instantiations, for firing.

One way in which the inference engine may determine if the rules' conditions are satisfied is to test each of the conditions of each of the rules against the facts in the working memory and keep track of the rules whose conditions are satisfied. However, in many circumstances the same condition is included in a number of rules. Further, in most circumstances, it is not necessary to evaluate every working memory relation against every rule during every recognize/act cycle. Instead, partial lists of relation/rule associations can be maintained and incremental updates performed to these lists as relations are added, deleted or modified. To avoid the necessity of testing or retesting such conditions for each rule, reticular, or "RETE" networks have been developed. In a reticular network, the conditions of all the rules are organized as a series of test nodes, with one test node being associated with each condition. Each of the rules, in turn, is represented by a terminal node. The test nodes are connected to the terminal nodes through a network of join nodes, each of which represents a logical operation in connection with each successive condition in the rule. During the "recognize" portion of the recognize/act cycle, tokens are passed between the nodes representing successful comparisons, with the tokens that eventually reach the terminal node representing the various instantiations of the rule. These tokens which represent successful comparisons are termed "beta tokens."

In beta-token partitioning systems, these beta tokens are divided among multiple processors of a computer system in order to approximately equally divide the computational load among the processors.

SUMMARY OF THE INVENTION

The invention provides a new and improved system for rule partitioning in an expert system program to run on multiple processors.

In brief summary, in one aspect the invention is a rule-partitioning system for converting at least a portion of a target expert system program to a rule partitioned RETE network for execution on multiple processors. The invention includes a rule partitioning portion for assigning different rules of the target expert system program to different partitions on the basis of previously collected processing statistics and on the use of node sharing; and a compiler for converting the target expert system program to the RETE network, wherein at least some of the rules of the RETE network are assigned to the multiple processors in accordance with the partition assignments.

Preferred embodiments include the following features. The rule partitioning portion includes an iteration module for temporarily assigning a rule selected from a group of unassigned rules to each of the different partitions; an evaluation module for estimating a performance measure for each such temporary assignment of the selected rule, the performance measure being derived from the processing statistics and taking into account node sharing; and an assignment module for permanently assigning the selected rule to the partition which yields the best performance measure. The performance measure is an estimate of the time it would take for the multiple processors to complete at least one recognize-act cycle of the portion of the target expert system program to be rule-partitioned and the selected rule is the unassigned rule requiring the most time to process. Further, the processing statistics include the number of activations per recognize-act cycle for the nodes of the RETE network and the estimate of the time to complete at least one recognize-act cycle is derived by computing a partition process time for each partition for each recognize-act cycle, the partition process time being computed by summing the number of activations of each of the nodes which make up the rules that are assigned to that partition. Also, a partition to which the selected rule is temporarily assigned may have permanently assigned rules that share nodes with the selected rule and the rule partitioning portion takes into account node sharing by including the shared node's contribution to the partition process time only once per recognize-art cycle. In addition, the estimate of the time to complete at least one recognize-act cycle is derived by summing the largest partition process times for each recognize-act cycle over all recognize-act cycles. In accordance with yet another feature, the nodes are grouped into a plurality of blocks such that each block of the plurality of blocks represents nodes that are shared by the same set of rules and the processing statistics include the number of activations per recognize-act cycle for the blocks of the RETE network.

In another aspect, the invention is a system that includes a uniprocessor compiler for compiling a target system program to form a RETE network for execution on a single processor, some of the nodes of the uniprocessor RETE network possibly being shared by more than one rule; a processor for executing the target expert system program, the processor obtaining processing statistics in connection with each node of the uniprocessor RETE network during execution; a rule partitioning portion for assigning different rules of at least a portion of the target expert system program to different partitions based on the processing statistics and on the use of node sharing; and a multiprocessor compiler for converting the target expert system program to a RETE network for execution on multiple processors, wherein the rules of the multiprocessor RETE network are assigned to the multiple processors in accordance with the partition assignments.

In yet another aspect, the invention is a method of rule partitioning a target system program. The method includes the steps of compiling the target expert system program to form a RETE network for execution on a single processor; identifying the nodes of the network that are shared by more than one rule of the target expert system program; executing the target expert system program on a single processor to obtain processing statistics on the nodes of the RETE network; partitioning the rules of at least a portion of the target expert system program among the processors of a multiprocessor system, the process of partitioning taking into account the possibility of node sharing; and recompiling the target expert system program to form a RETE network for execution on the multiprocessor system, wherein the rules of the target expert system program are assigned to processors in accordance with the partitioning.

In yet a further aspect, the invention is a computer program for use in connection with a computer. The computer program includes a uniprocessor compiler for enabling the computer to compile a target system program to form a RETE network for execution on a single processor, some of the nodes of the uniprocessor RETE network possibly being shared by more than rule; a module for enabling the computer to execute the target expert system program, the computer obtaining processing statistics in connection with each node of the uniprocessor RETE network during execution; a rule partitioning module for enabling the computer to assign different rules of at least a portion of the target expert system program to different partitions based on the processing statistics and on the use of node sharing; and a multiprocessor compiler module for enabling the computer to convert the target expert system program to a RETE network for execution on multiple processors, wherein the rules of the multiprocessor RETE network are assigned to the multiple processors in accordance with the partition assignments.

The invention uses node sharing in determining how to allocate the processing of rules of a RETE network among multiple processors. Among other advantages, this results in a significant improvement in the time it takes to run a target system program in comparison to conventional approaches to rule-partitioning, which either prevent or ignore node sharing.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 3B-1 and 3B-2 depict data structures useful in understanding beta partitioning in accordance with the invention;

FIGS. 3C-1 through 3C-5 depict beta-token partitioning opinion rules and FIGS. 3D-1 through 3D-4 depict beta decision rules, all of which are useful in connection with the beta-token partitioning in accordance with the invention;

FIGS. 4A and 4B depict portions of a RETE network which is useful in understanding rule partitioning in accordance with the invention;

FIGS. 5 and 6 depict data structures which are used in rule partitioning in accordance with the invention.

DETAILED DESCRIPTION OF AN ILLUSTRATIVE EMBODIMENT

Figure 1:
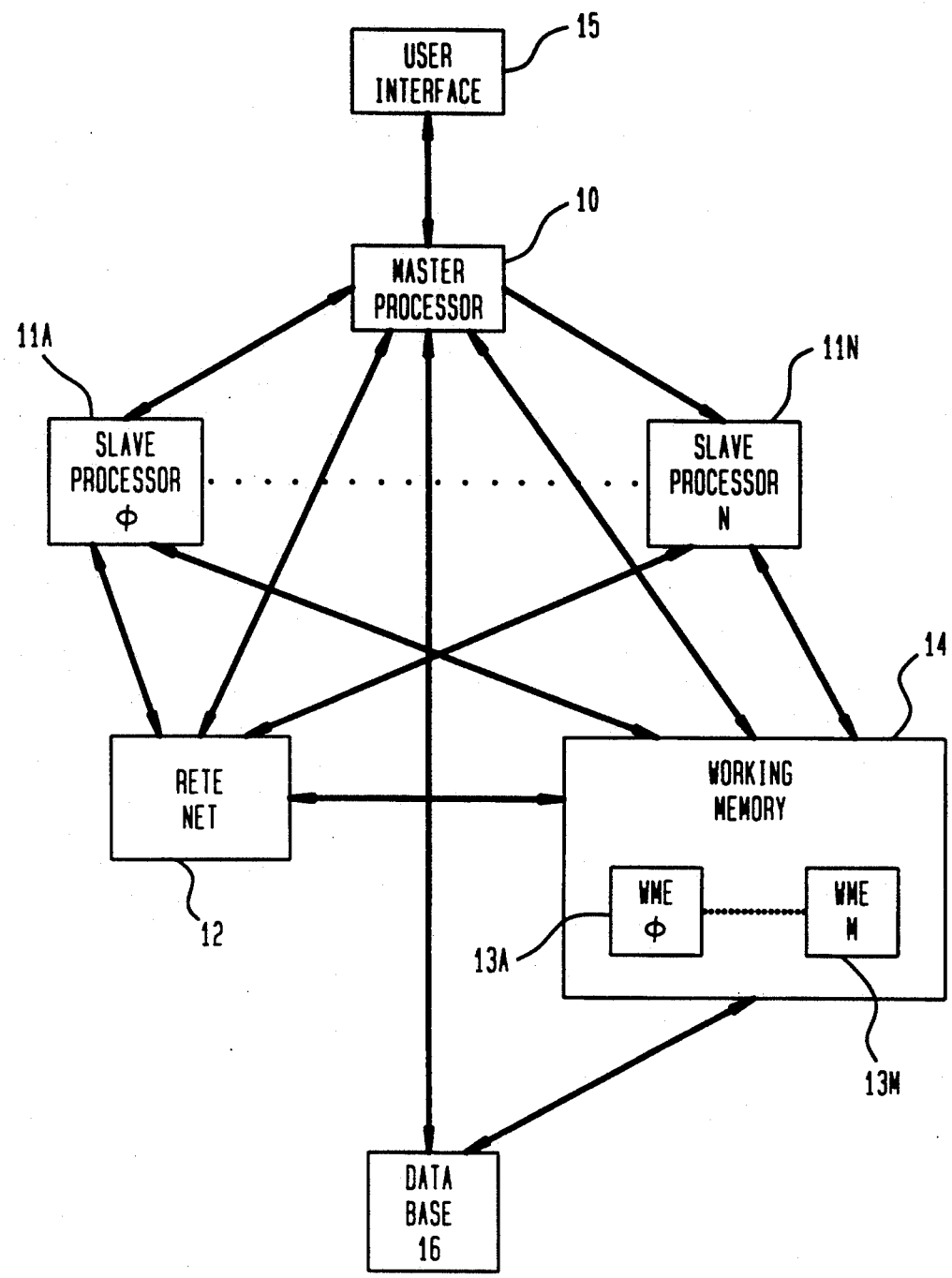
FIGS. 1 and 2 depict an expert system with respect to which the invention is used.
Figure 2:
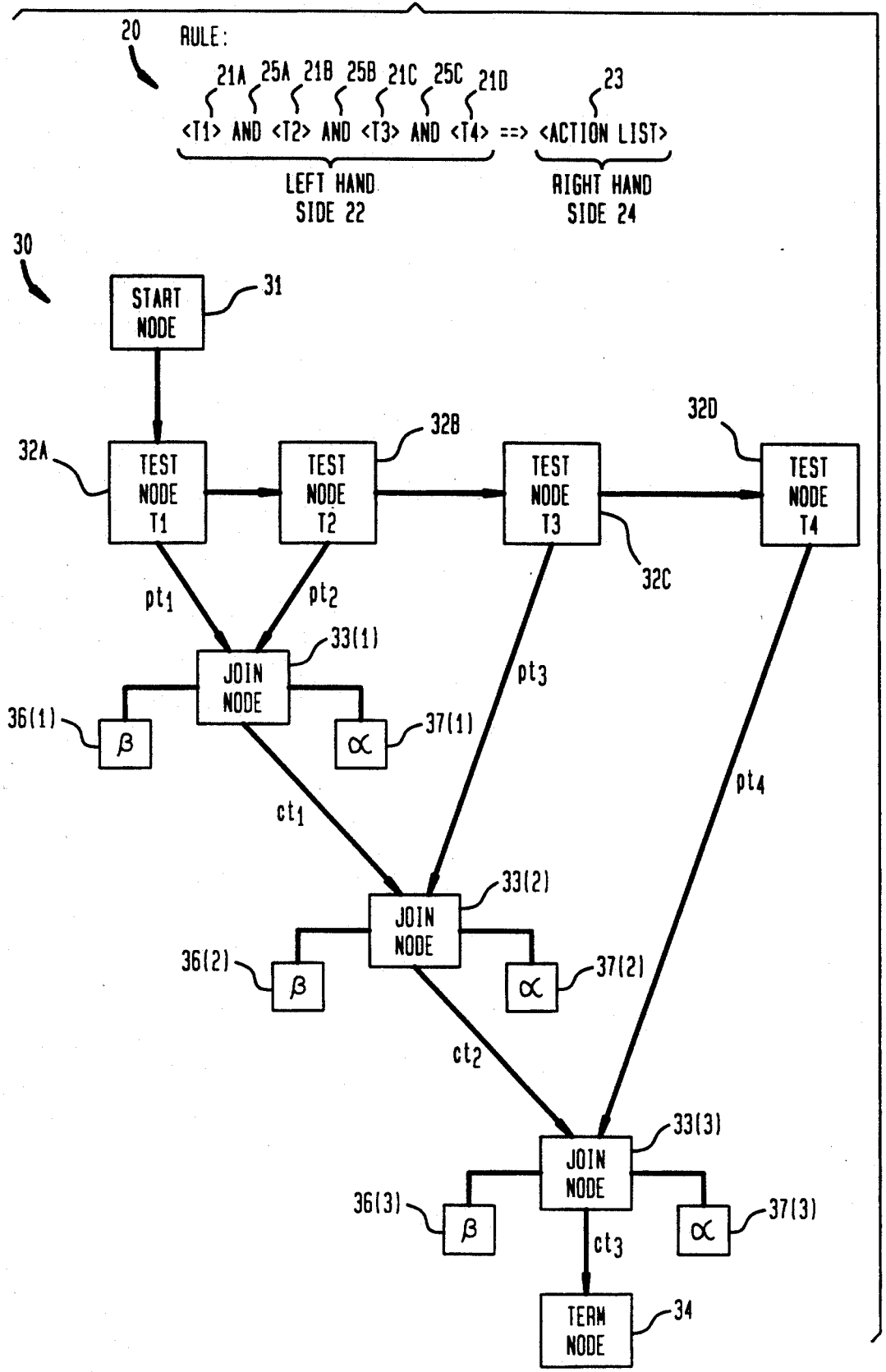

By way of background, the invention is useful in connection with an expert system such as depicted in FIGS. 1 and 2. With reference to FIG. 1, the expert system includes a master processor 10 and a plurality of slave processors 11A through 11N (generally identified by reference numeral 11) that process rules organized in a RETE network 12 using working memory elements 13A through 13M (generally identified by reference numeral 13) in a working memory 14 and information provided by an operator at a user interface 15. The master processor 10 enables the system to be initialized, including the creation of an initial set of working memory elements 13 in the working memory 14 based on data in a database 16. In addition, the master processor 10 enables the slave processors 11 to operate to process the working memory elements 13 in relation to the rules in the RETE network 12. It will be appreciated that, during the rule processing operations, the master processor 10 may also assist in the rule processing operations, operating effectively as another slave processor 11.

The slave processors 11 process the rules organized in the RETE network 12 in an inference cycle. That is, in response to a change in the working memory elements 13 in the working memory 14, which may result from, for example, the creation of a new working memory element 13 by the deposit of information by the operator at the user interface 15, or by the creation of one or more working memory elements 13 by the firing of a rule in the RETE network 12 during a previous inference cycle, the slave processors 11 process the rules in the RETE network 12 using the working memory elements 13 then in the working memory 14, select one rule to execute, or fire, and perform actions identified in the rule. The actions may include, for example, deposit of a new working memory element 13 in the working memory 14, deletion of a working memory element 13 from the working memory 14, modification of a working memory element 13, transmission of a message to the user interface 15 for display to an operator, termination of operation, and the like. The system may iteratively perform one or a number of inference cycles, until either (1) no rule remains that has all of its conditions satisfied, or (2) one of the actions specified by a rule selected to fire is a termination of operation. At that point, the system may wait for the operator to deposit further information, thereby creating a change of the working memory elements 13 in the working memory 14, before beginning another inference cycle.

As noted above, the rules are organized in the form of the RETE network 12. By way of background, one example of a rule and its RETE network equivalent are shown in FIG. 2. With reference to FIG. 2, the rule, identified by reference numeral 20, includes one or more conditions 21A through 21D (generally identified by reference numeral 21) and logical connectors 25A through 25C (generally identified by reference numeral 25) that define logical relationships among the conditions 21, all of which are collectively identified as its "left hand side" 22, and an action list 23 comprising its "right hand side" 24. During an inference cycle, the set of conditions 21 comprising the left hand side 22 and the logical relationships defined by the logical connectors 25 are tested against the working memory elements 13 contained in the working memory 14 to identify those rules 20 whose left hand sides are satisfied. Those rules 20 whose left hand sides are satisfied are said to be in condition for firing.

After all of the rules have been processed to identify those in condition for firing, conflict resolution information (not shown), which may be included with the rules, is used to identify which rule of the one or more of the rules 20 that are in condition for firing will actually be fired. In firing a rule 20, one or more operations, as defined in the action list 23 comprising the rule's right hand side 24, are performed to complete the inference cycle. If the firing results in a creation, deletion or modification of a working memory element 13, another inference cycle may be performed to process the rules comprising the RETE network 12 in connection with the new collection of working memory elements 13.

The portion 30 of the RETE network 12 for the rule 20 is also shown in FIG. 2. The portion 30 includes a plurality of nodes, including a start node 31, a test node list 32 comprising one or more test nodes 32($i$) ["i" being an integer; four test nodes, identified by reference numerals 32(1) through 32(4), are shown in FIG. 2], one or more join nodes 33(1) through 33(3) (generally identified by reference numeral 33) and a terminal node 34. Each of the test nodes 32 corresponds to a test of one of the conditions 21 in the left hand side 22 of the rule. Similarly, each join node 33 corresponds to a logical connector 25 in a rule. The last join node 33(3) in the sequence connects to the terminal node 34, which effectively represents the rule's action list 23.

In one embodiment of the RETE network 12, the test node list 32 essentially forms a linked list, and the start node 31 contains a pointer identifying a first test node 32(1) in the list 32. Each test node 32($i$), in turn, contains a pointer to a subsequent test node 32($i+1$), which the last test node 32 containing, instead of a pointer to a subsequent test node, a value identifying it as the last test node in the list 32. Each test node 32($i$), in turn, defines a test condition and also contains a pointer to a join node 33 defining a logical connector 25. The join node 33(1) defining the first logical connector 25A in the rule 20 is pointed to by the test nodes 32(1) and 32(2) for the first two conditions in the rule, and the join node 33($i$) ("i" is an integer) for each subsequent logical connector 25($i$) is pointed to by the preceding join node 33($i-1$) and the test node 32($i+1$) for the condition 21($i+1$) in the rule 20 immediately after the logical connector 25($i$).

It will be appreciated that normally the expert system (FIG. 1) will include a number of rules, and the RETE network 12 will have a number of portions similar to portion 30 for the various rules. Typically, such a RETE network will have a plurality of test nodes $32(i)$, one test node $32(i)$ for each of the distinct conditions in the rules so that, if the same condition appears in multiple rules, the RETE network 12 will include only one test node $32(i)$ therefor. In that case, the test node $32(i)$ will have pointers to each of the join nodes 33 for the different rules, thereby enabling multiple rules to share test nodes $32(i)$. In addition, join nodes 33 may be shared among rules if the same series of preceding join nodes and test conditions are used in multiple rules. The RETE network 12 thus facilitates sharing of test nodes $32(i)$ and join nodes 33 among a plurality of rules, represented by terminal nodes 34.

In operation, the slave processors 11 use the pointer of the start node 31 to identify the test node list 32 containing test nodes $32(i)$ representing the various conditions and test the test conditions pointed to thereby in connection with the working memory elements 13 in the working memory 14. If a working memory element 13 satisfies a test condition of a test node, the slave processor 11 generates a primitive token $Pt_n$ ["n" corresponding to the test node $32(i)$ in response to which the primitive token was generated] and deposits it in a beta memory $36(i)$ (generally identified by reference numeral 36) or an alpha memory $37(i)$ (generally identified by reference numeral 37), both of which are associated with the join node $33(i)$ identified by the test node $32(j)$ ("j" comprising an integer). If, as is the case with test node $32(1)$, the test condition 21 in the rule 20 is to the left (as shown in FIG. 2) of the logical connector 25 represented by join node 33, the primitive token $Pt_n$ is deposited in the beta memory 36 of the join node 33. Otherwise, as is the case with test nodes $32(2)$ through $32(4)$, if the test condition 21 is to the right (as shown in FIG. 2) of the logical connectors 25A through 25C represented by join nodes $33(1)$ through $33(3)$, respectively, the primitive tokens $Pt_n$ are deposited in the alpha memories 37 of the respective join nodes $33(1)$ through $33(3)$.

In particular, with reference to the example shown in FIG. 2, if the slave processor 11 processing the condition identified by the test node $32(1)$ determines that a working memory element 13 satisfies the condition, it generates a primitive token $Pt_1$, which it loads into the beta memory $36(1)$ associated with the join node $33(1)$. The primitive token $Pt_1$ identifies the working memory element 13 that satisfied the condition. If multiple working memory elements 13 satisfy the condition, the slave processor 11 generates multiple primitive tokens for storage in the beta memory 36. Similarly, if a slave processor 11 processing the condition identified by the test node $32(2)$ determines that one or more working memory elements 13 satisfy the condition identified by that test node, it generates corresponding primitive tokens $Pt_2$, which it loads into the alpha memory $37(1)$ associated with the join node $33(1)$. The slave processors 11 processing the conditions identified by the remaining test nodes $32(3)$ and $32(4)$ associated with portion 30, perform similar operations, loading primitive tokens into alpha memories $37(2)$ and $37(3)$ associated with the join nodes $33(2)$ and $33(3)$, respectively. The slave processors 11 perform similar operations in connection with rules defined by all of the portions of the RETE network 12.

The slave processors 11 may perform the test operations defined by the test nodes $32(i)$ on the working memory elements 13 in parallel. The test nodes $32(i)$ may be apportioned among slave processors 11 by any scheme, such as by round-robin allocation of portions 30 to the various slave processors 11, and each slave processor 11 may perform the test operations in connection with all of the working memory elements 13.

After the slave processors 11 have tested at least some of the working memory elements 13 in relation to the test nodes 32, and deposited the requisite primitive tokens $Pt_n$ in the respective memories 36 or 37 of the join nodes 33, they proceed to perform tests defined by the successive join nodes $33(1)$ through $33(3)$ to identify sets of working memory elements 13 that satisfy each succeeding logical connection identified by the join nodes 33. As a slave processor 11 performs the test for the logical connection defined by a join node 33, it generates one or more complex tokens $Ct_n$ identifying combinations of working memory relations or elements 13 which satisfied the test. For example, a slave processor 11 processing the join node $33(1)$ (FIG. 2) generates complex tokens $Ct_1$, which it deposits in the beta memory 36 of the join node $33(2)$. Each complex token $Ct_1$ identifies a pair of working memory relations or elements 13 which jointly satisfy the logical operation defined by the logical connector 25A represented by the join node $33(1)$.

The slave processors 11 process the other join nodes $33(2)$ and $33(3)$ in a similar manner. In the case of join node $33(2)$, the slave processors 11 perform the logical operation defined by the logical connector 25B in connection with the complex tokens $Ct_1$ in the beta memory $36(2)$ of the join node $33(2)$ and the primitive tokens $Pt_3$ in its alpha memory $37(2)$ to generate complex tokens $Ct_2$. Each complex token $Ct_2$ identifies groups of working memory relations or elements 13, which are jointly identified by a complex token $Ct_1$ in the beta memory $36(2)$ of the join node $33(2)$, and primitive tokens $Pt_3$ in the alpha memory $37(2)$ of the join node $33(2)$, that jointly satisfy the logical operation defined by the logical connector represented by the join node $33(2)$. The slave processors deposit the complex tokens $Ct_2$ in the beta memory $36(3)$ of the join node $33(3)$.

Similarly, in the case of join node $33(3)$, the slave processors 11 perform the logical operation defined by the logical connector 25C in connection with the complex tokens $Ct_2$ in the beta memory $36(3)$ of the join node $33(3)$ and the primitive tokens $Pt_4$ in the alpha memory $37(30$ of the join node $33(3)$ to generate complex tokens $Ct_3$. Each complex token $Ct_3$ identifies groups of working memory or relations elements 13, which are jointly identified by a complex token $Ct_2$, in the beta memory $36(3)$ of the join node $33(3)$, and primitive token $Pt_4$ in the alpha memory $37(3)$ of the join node $33(3)$, that jointly satisfy the logical operation defined by the logical connector 25 represented by the join node $33(2)$. The slave processors 11 deposit the complex tokens $Ct_3$ in terminal node 34.

Each complex token $Ct_3$ in the terminal node 34 represents an instantiation of the rule represented by the terminal node 34. That is, each complex token $Ct_3$ represents a combination of working memory elements 13 that satisfies the rule. The slave processors 11 identify the terminal nodes 34 representing the rules in the expert system that have complex tokens, and perform conflict resolution operations in connection with those rules, to identify one or several instantiations to fire. In selecting an instantiation to fire, the slave processors 11 use conflict information (not shown) which may accompany the various rules in a conventional manner.

Figure 3A:
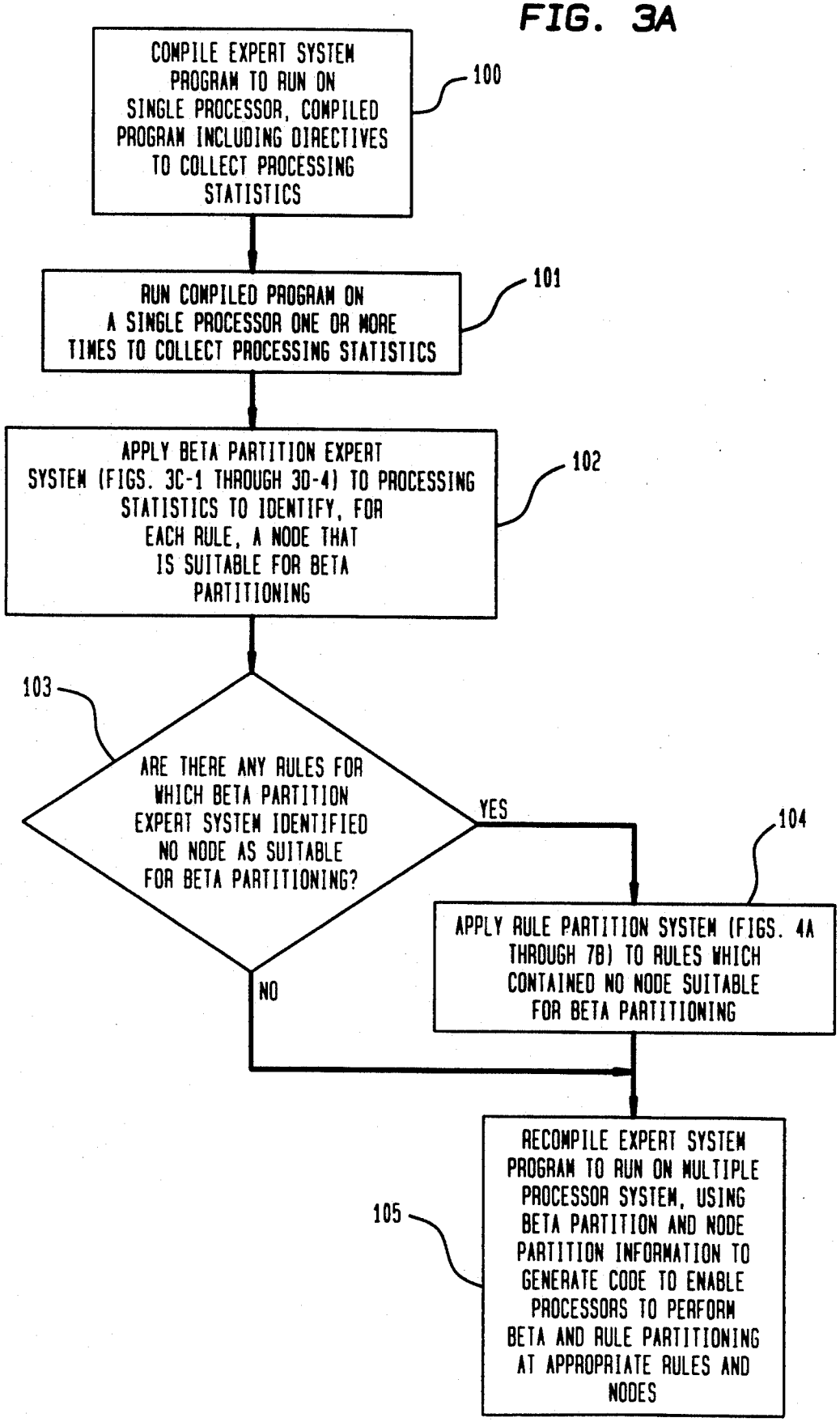
FIG. 3A depicts a flow chart describing the operations of beta and rule partitioning performed in connection with the invention.

The invention provides a beta-token partitioning system, generally depicted in the figures including and following FIG. 3A, to enhance the processing of the RETE network 12 in parallel by the various slave processors 11. Beta-token partitioning in a RETE network is generally described in the aforementioned U.S. patent application Ser. No. 103,364, filed Sep. 30, 1987, in the name of William Barabesh and William S. Yerazunis and entitled "Method For Operating A Parallel Processing System And Related Apparatus" now U.S. Pat. No. 4,965,882. As described therein, in beta-token partitioning, processing of the working memory elements 13 defined by the tokens $Pt_n$ or $Ct_n$ in either the beta or alpha memories of one join node 33 in one or more of the rules is divided among the respective slave processors 11. Thus, beta-token partitioning effectively enables the contents of either a beta or alpha memory 36 or 37 at a join node 33 to be divided among the various slave processors 11 during processing of the target expert system program defined by the RETE network. In the aforementioned application, the beta-token partitioning is described as being performed on the first join node 33(1) in all of the rules, but it notes that partitioning may be performed on any join node 33.

In accordance with the invention, an expert system beta-token partitioner is provided which identifies an optimum join node 33 at which beta-token partitioning is performed. That is, the expert system beta-token partitioner may, based on application of predetermined heuristic criteria, identify, for a particular rule, a join node 33 as a candidate for beta-token partitioning, and particularly may indicate whether beta-token partitioning should be performed on the join node's beta memory 36 or its alpha memory 37. On the other hand, if, upon application of the heuristic criteria, no join node 33 is identified, no beta-token partition occurs in the rule. For those rules in which no beta-token partition occurs, a rule partition operation may be performed, as described below in connection with FIGS. 4A through 7, to fairly divide processing of those rules among the various slave processors 11.

With reference to FIG. 3A, to accommodate the beta-token partitioning, the target expert system program, that is, the expert system program which is to undergo beta-token partitioning, is compiled, in a conventional manner, to run on in a digital data processing system comprising a single processor (step 100). The compiled target expert system program includes directives to facilitate collection of a number of statistics regarding processing at each node during execution of the compiled target expert system program by the single processor. The processing statistics that are collected during execution will be described below in detail particularly in connection with FIG. 3B-1. Briefly, the processing statistics include such information as the number of primitive and complex tokens $Pt_n$ and $Ct_n$ received in the beta and alpha memories of each of the join nodes 33, the number of comparisons performed in connection with processing of the join nodes 33 in generating the complex tokens $Ct_n$, the number of complex tokens $Ct_n$ emitted by each of the join nodes 33, and the amount of processor time spent at each join node 33.

After the target expert system program undergoing beta-token partitioning is compiled, it is run, on a digital data processing system including a single processor, one or more times to facilitate the collection of the processing statistics (step 101). After processing statistics have been collected, they are analyzed by the beta-token partitioning expert system, which is described below in connection with FIGS. 3A through 3D-4 to locate a join node 33 which is optimal, based on knowledge embedded in the expert system, for beta-token partitioning (step 102).

If the beta-token partitioning expert system determines that a rule contains no join node 33 optimal for beta-token partitioning (step 103), the rule is placed in a group to be executed on a single processor. Alternatively, the collection of rules which are not beta-partitioned may instead be rule-partitioned by a rule-partitioning system, such as described below. After the processing statistics for all of the rules have been processed in this manner, a rule partitioning operation is performed on the rules in the group for rule partitioning, that is, on all of the rules that did not contain any join nodes optimal for beta-token partitioning (step 104). After the beta-token partitioning operations have been completed in step 103, or after the rule-partition operations have been performed in step 104, the expert system program is then re-compiled for execution in a digital data processing system containing multiple processors (step 105).

Beta-Token Partitioning Expert System

Figures 2, 3B:
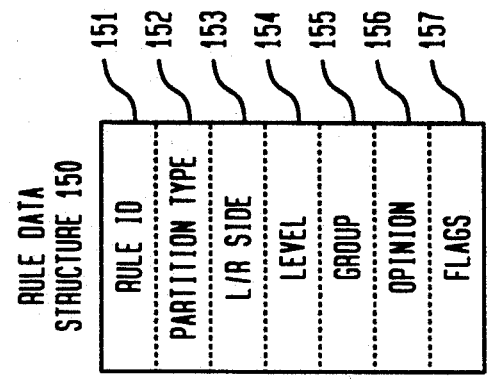
Figures 1, 3B:
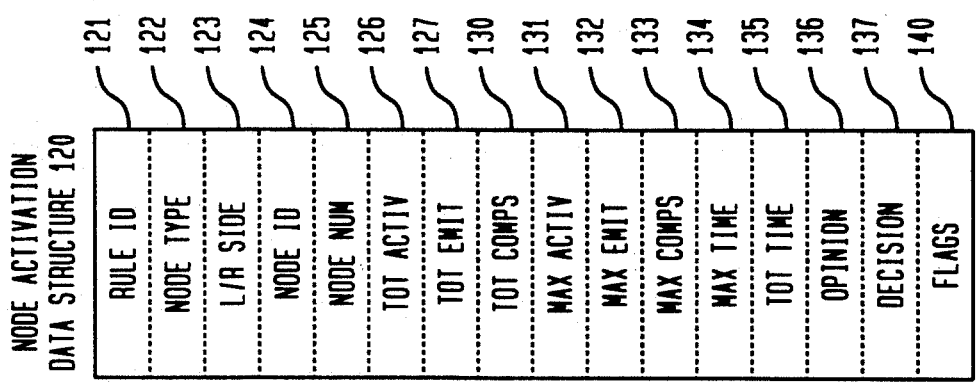

The beta-token partitioning expert system will be described in connection with FIGS. 3B-1 through 3D-4. FIGS. 3B-1 and 3B-2 depict data structures for two types of working memory elements used by the beta-token partitioning expert system. In one specific embodiment, the processing statistics are separately maintained for each activation of a join node, that is, for each of the beta and alpha memories 36 and 37, and the beta-token partitioning expert system separately processes the statistics for the two sides as separate nodes to determine whether partitioning should occur in connection with the contents of the beta or alpha memory 36 or 37 of a rule. FIG. 3B-1 depicts the data structure of a node activation data structure 120 for each node activation. For each target expert system rule undergoing beta-token partitioning processing, the beta-token partitioning expert system generates a rule data structure 150, which is depicted in FIG. 3B-2, which effectively stores status for the target expert system rule.

FIGS. 3C-1 through 3C-5 depict beta-token partitioning opinion rules that are applied to node activation data structures 120 which store processing statistics for each of the node activations to effectively generate raw partitioning scores. The raw partitioning scores are processed by beta decision rules, depicted in FIGS. 3D-1 through 3D-5, to determine, in each rule, where, if anywhere, beta-token partitioning should be performed. The application of the beta decision rules results in the generation of a rule data structure 150 defining a rule for each of the target expert system rules being processed. In addition, control rules, not shown, may be provided to perform various control functions in connection with the beta-token partitioning expert system, such as eliminating node activation data structures 120 not necessary for further processing, display of results, and so forth.

With this background, and with reference to FIG. 3B-1, a node activation data structure 120, includes a plurality of fields. A rule identification field 121 contains a rule identification value that identifies the rule in the target expert system program that is undergoing beta-token partitioning. A node identification field 124 contains a node identification value which identifies the join node 33 to which each node activation data structure relates among node activation data structures 120 for the node activations for all of the join nodes 33 in the target expert system program. A node number field 125 receives a value identifying the position of the join node 33 in the sequence relative to the other join nodes of the rule identified by the contents of the rule identification field 121; the contents of the node number field effectively identifies the location of the logical connector 25 in the rule 20 (FIG. 2A) associated with the node activation data structure 120. A left/right side field 123 receives a value that associates the node activation data structure 120 with the beta memory 36 (which is situated to the left, as shown in FIG. 2) or alpha memory 37 (which is situated to the right, as shown in FIG. 2) of the node 33. Thus, the combined contents of the rule identification field 121, node number field 125 and left/right side field 123 jointly identify the node activation of the node activation data structure 120 among all node activations for the target expert system program whose processing statistics are being processed by the beta-token partitioning expert system. Otherwise stated, the three fields 121, 125 and 123 jointly identify the node activation among all node activations for the target expert system program whose processing statistics are being processed. In one embodiment, the contents of the node identification field 124 relates the join node 33 associated with the node activation data structure 120 to the particular format of the processing statistics generated during test execution of the compiled target expert system program (step 101, FIG. 3A).

The node activation data structure 120 also includes a node type field 122 which identifies the logical connector 25 associated with the join node 33 with which the data structure is associated. Several types of logical connectors 25 may be provided, including, for example, an AND connector and a NOT connector. An AND connector in a rule in the target expert system program undergoing beta-token partitioning is satisfied if the conditions 21 preceding the AND connector, as linked by their respective logical connectors 25, are satisfied by the contents of the working memory 14 and if the working memory 14 contains a working memory element 13 which satisfies the condition after the AND connector 25. A NOT connector, on the other hand, is satisfied if the working memory 14 contains working memory elements 13 which satisfy the conditions, as linked by their respective connectors 25, preceding the NOT connector, but no working memory element 13 which satisfies the specific condition immediately following the connector.

The node activation data structure 120 also includes two sets of fields for receiving processing statistics. Several types of processing statistics are maintained that are separately related to each node activation, that is, that are separately related to each of the beta and alpha memories 36 and 37, including a "number of activations" value, a "number of emissions" value and a "number of comparisons" value. The "number of activations" value relates to the number of tokens, whether primitive tokens $Pt_n$ or complex tokens $Ct_n$ deposited in the beta memory 36, if the node activation data structure 120 relates to a left node activation, that is, a node activation testing a condition or conditions located to the left of a join node 33. Alternatively, if the node activation data structure 120 relates to a right node activation, the "number of activations" value relates to the number of primitive tokens $Pt_n$ in the alpha memory 37. The "number of emissions" value relates to the number of complex tokens $Ct_n$ that are generated and emitted while processing the join node 33, and the "number of comparisons" value relates to the number of comparisons performed during processing of the join node 33.

The node activation data structure 120 includes two sets of fields for these processing statistics. One set, comprising a total activation field 126, a total emission field 127 and a total comparisons field 130, receive processing statistics regarding total activations, emissions and comparisons performed in connection with the node activation over the entire time during which processing statistics were generated. On the other hand, a maximum activations field 131, maximum emissions field 132 and maximum comparisons field 133 receives processing statistics regarding the maximum number of activations, emissions and comparisons performed in any recognize/act cycle. The node activation data structure 120 includes a maximum time field 134, which identifies the maximum time spent during processing of the join node during a recognize/act cycle, and a total time field 135, which identifies the total amount of processing time spent by the processor in processing the join node 33.

The node activation data structure 120 further includes three fields for maintaining status information during processing of the beta-token partitioning expert system. An opinion field 136 holds a beta-token partitioning value, which is incremented or decremented as various tests, defined by the beta-token partition opinion rules (FIGS. 3C-1 through 3C-5), are applied. A decision field 137 holds a decision value which indicates whether the node activation should be beta-token partitioned; that is, the decision field 137 indicates whether the corresponding join node 33 is optimum for beta-token partitioning along the beta or alpha memory 36 or 37 associated with the node activation data structure 120. Finally, a flags field 140 contains a plurality of flags which are used in sequencing through the various beta-token partition opinion rules (FIGS. 3C-1 through 3C-5).

FIG. 3B-2 depicts the structure of a rule data structure 150 generated for each of the rules of the target expert system program by the beta-token partition expert system. With reference to FIG. 3B-2, the rule data structure 150 includes a rule identification field 151 which stores a rule identification value that identifies the rule in the target expert system program undergoing beta-token partitioning. A partition type field 152 stores partition type information that indicates whether the beta-token partition expert system has determined that a join node 33 in the rule, identified by the contents of rule identification field 151, is optimal for beta-token partitioning. If the partition type field 152 indicates that the rule includes a join node that is optimal for beta-token partitioning, a level field 154 identifies the node number of the optimal join node 33 and a left/right side field 153 indicates whether the beta-token partitioning should be in connection with the join node's beta or alpha memory 36 or 37. If the partition type field 152 indicates that the rule be beta-token partitioned, an opinion field 156 identifies an opinion value. The opinion value is copied from the opinion field 136 of the node activation data structure 120 associated with the node at which beta-token partitioning is to occur.

As described above, for those rules indicated by the beta-token partition expert system as not having join nodes 33 optimal for beta-token partitioning, a rule partitioning operation is performed. The rules are partitioned into one or more groups to accommodate maximal concurrent processing. A group field 155 is provided in the rule data structure 150 for the rules on which rule partitioning is performed. It identifies a rule partition group to which the rule is assigned during rule partitioning. Finally, the rule data structure 150 includes a flags field that contain various control flags as described below.

As noted above, the beta-token partitioning expert system includes three types of rules, including the beta-token partitioning opinion rules depicted in FIGS. 3C-1 through 3C-5, the beta decision rules depicted in FIGS. 3D-1 through 3D-5, and the control rules (not shown) that enable selected input/output and control operations, a complete description of which is not necessary to the understanding of the invention or the embodiment described herein.

To control use of the beta-token partitioning opinion rules, beta decision rules and control rules, the beta-token partitioning expert system includes several working memory elements defining contexts. One such working memory element is a BETA—HEURISTICS context, which, if it contains the value ACTIVE, enables use of the beta-token partitioning opinion rules. Otherwise stated, each of the beta-token partitioning opinion rules includes a condition that the BETA—HEURISTICS working memory element contain the value ACTIVE; if the BETA—HEURISTICS working memory element does not contain the value ACTIVE, the beta-token partitioning opinion rules can not fire. The beta-token partitioning expert system also includes a working memory element comprising a MAKE—BETA—DECISIONS context, which, if it contains the value ACTIVE, permits the beta decision rule to fire. Other working memory elements define other contexts used by the control rules.

With this background, and with reference to FIG. 3C-1 through 3C-5, the beta-token partitioning expert system includes thirteen beta-token partitioning opinion rules, identified as rules H1 through H13, each of which modifies the value of the contents of the opinion field 136 in response to the results of various tests, each defined by one of the beta-token partitioning opinion rules. The node activation data structure 120 for each node activation includes control flags, maintained in field 140 (FIG. 3A), to ensure that the rules fire only once for each node activation data structure 120.

With reference to FIG. 3C-1, rule H1 is used to provide that beta-token partition does not occur in connection with node activations for join nodes that are of type NOT. More specifically, if a node activation, identified in FIGS. 3C-1 through 3C-5 as "<THE —NODE>" of a join node 33 in a specific rule "RULE—ID-=<PR>", has a node activation data structure 120 whose node type field 122 contains a value NOT, and the flags field 140 contains an empty T1 flag, indicating that rule H1 has not been applied, the conditions of the rule H1, which are set forth in the portion of the rule following "IF", the rule fires. In that case, the operations defined in the portion of the rule following "THEN" are performed. In that case, the opinion field 136 of the node activation data structure 120 of the node activation "<THE—NODE>" is loaded with a large negative value, in one embodiment a value "−1000".

This value is selected to ensure that application of the beta decision rules will not select the node as optimum for beta-token partitioning, even if application of other rules may modify this value. The firing also results in setting of the flag T1 in the flags field 140 of the node activation's node activation data structure 120; since the rule's conditions require that the flag T1 must be clear for the rule to fire, the setting of the T1 flag ensures that the rule is applied at most once to a node activation.

Rule H2 is provided to mildly reduce the likelihood of beta-token partitioning in connection with left node activations that relate to the first join node 33(1) in the sequence of join nodes associated with a rule 20 in the expert system program, that is, those node activations associated with node activation data structures 120 having value "1" in their node number fields 125 and value "L" in their left/right side fields 123. A flag T9, maintained in flags field 140 of each node activation data structure 120, controls firing of rule H2. If the contents of the node activation data structure 120 for the node activation "<THE—NODE>" causes the rule H2 to fire, the contents of the opinion field 136 are decremented by value "1". In addition, the flag T9 is set in the node activation data structure 120 so that the node activation data structure 120 does not cause the rule H2 to fire again.

Rule H3 relates to a comparison between left and right node activations for a single node in a single rule of the target expert system program undergoing beta-token partitioning. Rule H3 is provided to increase the likelihood of beta-token partitioning of a node activation, identified by "<THE—NODE>", if the number of comparison operations performed in connection with the opposite side node activation of the join node 33 during the generation of processing statistics is above a threshold value. The threshold value, identified in the rule H3 as a parameter PARAM<GOOD—MAX-—COMPS>, in one embodiment is computed as ten times the number of processors for which the target expert system program is to be compiled for execution. Rule H3 fires for two node activations represented by node activation data structures 120 if the maximum comparisons field 136 associated with the opposite side node activation has a value greater than PARAM<GOOD—MAX—COMPS> and if their rule identification fields 121 contain the same values, node number fields 125 contain the same values, and left/right side fields 123 contain opposing (that is, "LEFT"versus "RIGHT") values. These three conditions ensure that two node activation data structures 120 are related to opposing node activations for the same rule 20 (as identified by the contents of the rule identification fields 121) and join node 33 (as identified by the contents of the node number fields 125). In addition, the node activation "<THE —NODE>" must have a node type of AND and a clear flag T2 for the beta-token partitioning opinion rule H3 to fire. If the beta-token partitioning opinion rule H3 fires, the contents of the opinion field 136 of the node activation data structure 120 of the node activation "<THE—NODE>" are incremented by seven, and the flag T2 is set so that the rule does not fire in connection with that node activation data structure 120 again.

Rule H4 is provided to test the contents of the maximum comparisons field 136 of a node activation whose left/right side field contains the value "RIGHT" to determine whether they exceed the parameter PARAM<GOOD—MAX—COMPS> and to increase the value of the contents of the opinion field 136 of the parent node activation (which is defined below) having the larger value in its maximum comparisons field 133. With reference to FIG. 3C-2, the rule H4 contains three conditions, each relating to a node activation represented by a node activation data structure 120.

The first condition of beta-token partitioning opinion rule H4 is the existence of a node activation "<THE—NODE>" having a node activation data structure 120 whose left/right side field contains the value "RIGHT", indicating that the node activation is a right side activation, whose node type field 122 contains the value AND, whose maximum comparisons field contains a value greater than PARAM<GOOD—MAX—COMPS>, and whose flags field 140 contains a clear flag T8.

The second and third conditions of beta-token partition opinion rule H4 are the existence of parent node activations, that is, the existence of node activation data structures 120 whose rule identification fields 121 contain values that identify the same target expert system program rule as that identified by the node activation data structure of the node activation "<THE—NODE>" and whose node number fields 125 contain values one less than the contents of the node number field 125 of the node activation data structure 120 of the node activation "<THE—NODE>". If all three conditions of beta-token partition opinion rule H4 are satisfied, the rule fires thereby increasing by a value "five" the contents of the opinion field 136 of the node activation data structure 120 of the parent node activation whose maximum comparisons field 133 contains the higher value are increased. In addition, flag T8 is set in flags field 140 of the node activation data structure 120 associated with the node activation "<THE—NODE>" to ensure that the rule does not fire again with the same set of node activation data structures 120.

The remaining beta-token partitioning opinion rules H5 through H13 are depicted in FIGS. 3C-3 through 3C-5 and will not be described in detail. Briefly, however, beta-token partition opinion rule H5 is provided to enable the decrement of the contents of the opinion field 136 of a node activation data structure 120 of a node activation "<THE—NODE>" if the contents of the maximum comparisons field is below a particular value, identified by parameter PARAM<BAD—MAX—COMPS>. In one particular embodiment, the parameter PARAM<BAD—MAX—COMPS> is computed to be three times the number of processors for which the target expert system program is to be compiled for execution, and firing of Rule H5 results in the contents of the opinion field 136 being decremented by a value of "four". Flag T3 in the flags field 140 of the node activation data structures 120 of the various node activations controls the application of the beta-token partition opinion rule H5.

Beta-token partitioning opinion rule H6 is provided to enable the increase of the contents of the opinion field 136 of the node activation data structure 120 of a node activation "<THE—NODE>" for a join node 33 if the node type field 122 of the node activation data structure 120 contains the value "AND" and if the contents of the maximum emissions field 132 are above a particular value, identified by a parameter PARAM<GOOD—MAX—EMITS>. In one particular embodiment, the parameter PARAM<GOOD—MAX—EMITS> is computed to be four times the number of processors for which the target expert system program is to be compiled for execution, and firing of Rule H6 results in contents of the opinion field 136 being incremented by a value of "five". Flag T4 in the flags field 140 of the node activation data structures 120 of the various node activations controls the application of the beta-token partitioning opinion rule H6.

Beta-token partitioning opinion rule H7 is provided to enable the increase of the contents of the opinion fields 136 of the node activation data structures 120 of a left node activation "<THE—NODE>", and of its parent node activations, if the contents of the maximum activations field 131 of the node activation data structure 120 of the node activation "<THE—NODE>" are above a particular value, identified by a parameter PARAM<GOOD—MAX—ACTIV>. In one particular embodiment, the parameter PARAM<GOOD—MAX—ACTIV> is computed to be five times the number of processors for which the target expert system program is to be compiled for execution, and firing of Rule H7 results in the contents of the opinion field 136 of the node activation data structure 120 of the left node activation "<THE—NODE>" being incremented by a value "three" and the contents of the opinion fields 136 of its parent node activations being incremented by a value of "two". Flag T5 in the flags field 140 of the node activation data structures 120 of the various node activations controls the application of the beta-token partition opinion rule H7.

Beta-token partitioning opinion rule H8 (FIG. 3C-4) enables the increase of the contents of the opinion field 136 of the node activation data structure 120 of a right node activation if the node type field 122 contains the value "AND", and the maximum activations field 131 of its node activation data structure 120 contains a value greater than the parameter PARAM<GOOD—MAX—ACTIV>. In the embodiment described herein, in which the parameter PARAM<GOOD—MAX—ACTIV> is computed as described above, the firing of Rule H8 results in the contents of the opinion field 136 being incremented by a value of "four". Flag T5 in flags field 140 of the node activation data structures 120 of the various node activations controls the application of beta-token partitioning opinion rule H8.

Beta-token partitioning opinion rule H9 is provided to enable the increase of the contents of the opinion field 136 of the node activation data structure 120 of a node activation "<THE—NODE>" if the node type field 122 has a value AND, and the contents of the total emissions field 127 are above a particular value, identified by a parameter PARAM<GOOD—TOT—EMIT>. In one particular embodiment, the parameter PARAM<GOOD—TOT—EMIT> is computed to be ten times the number of recognize/act cycles covered by the processing statistics used in formation of the node activation data structures 120 for the node activations, and the firing of Rule H9 results in the contents of the opinion field 136 being incremented by a value of "two". Flag T6 in the flags field 140 of the node activation data structures 120 of the various node activations controls the application of the beta-token partitioning opinion rule H9.

Beta-token partitioning opinion rule H10 is provided to enable an increase of the contents of the opinion field 136 of the node activation data structure 120 of a node activation "<THE—NODE>" if the node type field 122 has a value "AND" and the contents of the total comparisons field 130 of the node activation data structure 120 of its sibling node activation, that is, the opposite side node activation relating to the same join node 33 (FIG. 2), has a value greater than a parameter PARAM<GOOD—TOT—COMPS>. In one particular embodiment, the parameter PARAM<GOOD—TOT—COMPS> has a value corresponding to one hundred times the number of recognize/act cycles covered by the processing statistics used in formation of the node activation data structure 120 for the node activations, and the firing of Rule H10 results in the contents of the opinion field 136 being incremented by a value of "four". Flag T7 in the flags field 140 of the node activation data structures 120 of the various node activations controls the application of the beta-token partitioning opinion rule H10.

Beta-token partitioning opinion rule H11 (FIG. 3C-5) is provided to enable a moderate increase of the contents of the opinion field 136 of the node activation data structure 120 of a node activation "<THE—NODE>" if the node type field 122 has a value "AND" and the contents of the maximum time field 134 of the same node activation data structure 120 have a value larger than the parameter PARAM<GOOD—MAX—TIME>. In one particular embodiment, the parameter PARAM<GOOD—MAX—TIME> has a value corresponding to one hundred times the number of processors for which the target expert system program is to be compiled for execution, and the firing of Rule H11 results in the contents of the opinion field 136 being incremented by a value of "four". Flag T11 of the flags field 140 of the node activation data structures 120 of the various node activations controls the application of the beta-token partition opinion rule H11.

Beta-token partitioning opinion rule H12 is provided to enable a moderate increase in the contents of the opinion field 136 of the node activation data structure 120 of a node activation "<THE—NODE>" if the node type field 122 has a value "AND" and the contents of the total time field 135 of the same node activation data structure 120 have a value larger than the parameter PARAM<GOOD—TOT—TIME>. In one particular embodiment, the parameter PARAM<GOOD—TOT—TIME> has a value corresponding to one hundred times the number of recognize/act cycles covered by the processing statistics used in formation of the node activation data structure 120 for the node activations, and firing of Rule H12 results in the contents of the opinion field 136 being incremented by a value of "three". Flag T12 of the flags field 140 of the node activation data structures 120 of the various node activations controls the application of the beta-token partitioning opinion rule H12.

Finally, beta-token partitioning opinion rule H13 is provided to enable a small decrease in the contents of the opinion field 136 of the node activation data structure 120 of a node activation "<THE—NODE>" if the node type field 122 has the value "AND" and the contents of the total activation field 126 of the node activation data structure 120 have a value much larger than the value of the contents of the total emissions field 127 of the same node activation data structure 120. In one particular embodiment, the beta-token partition opinion rule H13 fires if the value in the total activation field 126 is greater than ten times the value in the total emissions field 127, and firing of Rule H13 results in the contents of the opinion field 136 being incremented by a value of "one". Flag T13 of the flags field 140 of the node activation data structures 120 of the various node activations controls the application of the beta-token partition opinion rule H13.

The six beta decision rules D1 through D6 are depicted in FIGS. 3D-1 through 3D-4. The beta decision rules are applied to the node activation data structures 120 for each rule 20 in the target expert system program and enable the comparisons of beta opinion values in the opinion fields 136 of various node activation data structures 120 of the node activations for each rule, both with each other and with selected threshold values. Generally, the beta decision rules determine that beta-token partitioning should not occur in connection with either:

(a) a node activation of a join node 33($i$) whose node activation data structure 120 has an opinion field 136 that contains a beta opinion value that is less than a predetermined threshold value established by a parameter PARAM<GOOD—BETA—CONST>, or (b) if a node activation of a join node 33($i$) whose node activation data structure 120 has an opinion field 136 that contains a beta opinion value that is greater than or equal to a predetermined threshold value established by a parameter PARAM<GOOD—BETA—CONST>, but the beta opinion value is less than or equal to the beta opinion value for a node activation of the next succeeding join node 33($i+1$) less a difference parameter value PARAM<GOOD—BETA—DELTA>.

Otherwise stated, the beta decision rules determine that beta-token partitioning should not occur for a node activation whose associated beta opinion value is less than a minimum threshold value, or for a node activation which has an associated beta opinion value that is larger than, or equal to, the minimum threshold value but for which a node activation of the next join node has an associated beta opinion value that is greater than or equal to that for the node activation being tested by at least a second "delta" value.

Among the other node activations, the beta decision rules depicted on FIGS. 3D-1 through 3D-4 enable the identification of a node activation in the first of the successive join nodes 33 for a rule 25 that is optimum for beta-token partitioning. When that occurs, a rule data structure 150 is created for the expert system program rule as explained below.

The beta decision rules D1 through D6 are depicted in the FIGS. and each will only be briefly described here. With reference to FIG. 3D-1, beta decision rule D1 enables the comparison of the contents of the opinion fields 136 of the node activation data structures 120 of the node activations of the first and second join nodes 33 of an expert system program rule. If (1) the higher of the first level opinion values, that is, the higher of the values contained in the opinion field 136 of the node activation data structures 120 of left and right node activations of the first join node 33 is greater than or equal to a selected value, namely, a parameter PARAM<GOOD—BETA—CONST>, and (2) the values of the opinion fields 136 of the node activation data structures 120 of the left and right node activations of the second join node exceed the higher first level opinion value by less than a second value, identified by a parameter PARAM<GOOD—BETA—DELTA>, then the beta decision rule D1 fires. In one embodiment, the values of the parameters PARAM<GOOD—BETA—CONST> and PARAM<GOOD—BETA—DELTA> are supplied by the operator. In one specific embodiment, the parameter PARAM<GOOD—BETA—CONST> has a default value of "six" and the parameter PARAM<GOOD—BETA—DELTA> has a default value of "four".

If the beta decision rule D1 fires, the node activation of the first level join node 33 having the higher first level opinion value is deemed optimum for beta-token partitioning. The firing of the beta decision rule D1 results in loading of a number of additional values into the other fields of the rule data structure 150. In particular, a value BETA—PART—HERE is loaded into the decision field 137 of the node activation data structure 120 for that node activation to so indicate. In addition, a rule data structure 150 for a rule is created and the rule identification field 151 is loaded with a value to identify the target expert system program rule, taken from field 121 of the node activation data structure 120 of the node activation. A value "BETA" is loaded into the partition type field 152 to indicate that beta-token partitioning is to occur at that node activation. A value "1" is loaded into the level field 154, to indicate that the beta-token partition is to occur at the first join node 33 associated with the rule 25. The contents of the left/right side field 123 of the node activation data structure 120 for the node activation are copied into the left/right side field 153 of the newly created rule data structure 150, to further identify the node activation at which beta-token partitioning is to occur. In addition, the contents of the opinion field 136 of the node activation data structure 120 for the node activation are copied into the opinion field 156 of the newly-created rule data structure 150.

Beta decision rule D2 (FIG. 3D-2) enables the comparison of the contents of the opinion fields 136 of the node activation data structures 120 of the left and right side node activations at the first join node 33 of a rule 20, and fires if (1) the value of the higher is greater than or equal to the value of parameter PARAM<GOOD—BETA—CONST>, and (2) there are no node activation data structures 120 of node activations of a second join node 33, which occurs if the expert system program rule does not contain any second join nodes 33. The firing of the beta decision rule D2 results in the same operations as does firing of beta decision rule D1.

Beta decision rule D3 enables the comparison of the contents of the opinion fields 136 of a node activation data structure 120 with the parameter PARAM<GOOD—BETA—CONST> and fires if the contents of the opinion fields 136 are lower than the value of the parameter. The firing of the beta decision rule D3 results in the loading of a decision value "NO" in the decision field 137 of the node activation data structures 120. Thus, if the value in the opinion field 136 of the node activation data structure 120 of any node activation is lower than the value of the parameter PARAM<GOOD—BETA—CONST>, beta-token partitioning does not occur at that node activation.

Beta decision rule D4 (FIG. 3D-3) enables a comparison between the contents of the opinion fields 136 of node activation data structures 120 for node activations for two succeeding join nodes 33. Beta-token partition rule D4 fires if the contents of the opinion field 136 of the node activation data structure 120 for the node activation of the first join node 33($i$) equals or exceeds the value of the parameter PARAM<GOOD—BETA—CONST>, and if the contents of that for the second join node 33($i$+1) exceeds that value by the value of the parameter PARAM<GOOD—BETA—DELTA>. The firing of the beta decision rule D4 results in the loading of a decision value "NO" in the decision field 137 of the node activation data structure 120 of the node activation of the first join node 33($i$). The effect of the beta decision rule D4 is that, if the beta opinion value of a node activation of one join node 33($i$) indicates that it is a candidate for beta-token partitioning, but the beta opinion value of either node activation of the next succeeding join node 33($i$+1) indicates that it is a better candidate, by at least the value of the parameter PARAM<GOOD—BETA—DELTA>, then beta-token partitioning should not occur at the node activation for the one join node 33($i$).

Beta decision rule D5 enables a comparison of the beta opinion values in the opinion fields 136 of node activation data structures 120 of node activations for the same join node 33($i$), if the beta decision value "NO" is contained in the decision fields 137 of the node activation data structures 120 of node activations for the preceding join node 33($i$−1) and there are no succeeding join nodes 33($i$+1). If the larger of the beta opinion values is greater than or equal to the value of the parameter PARAM<GOOD—BETA—CONST>, the beta decision rule D5 fires, and the operations describe above in connection with beta decision rule D1 are performed.

Beta decision rule D6 (FIG. 3D-4) is essentially directed to node activations between the first several join nodes 33 in an expert system program rule 25, which are covered by beta decision rules D1 and D2, and the last join node 33 in a target expert system program rule 25, which is covered by beta decision rule D5. The beta decision rule D6 enables the testing of conditions relating to (1) the contents of the decision fields 137 of the node activation data structures 120 of the node activations of preceding join nodes 33($i$−1) to determine if they both contain the value "NO", indicating that they are not optimum for beta-token partitioning, (2) the beta opinion values contained in the opinion fields 136 of the node activation data structures 120 of the node activations of the join nodes 33($i$) to determine if the larger beta opinion value is greater than or equal to the value of parameter PARAM<GOOD—BETA—CONST>, and (3) beta opinion values contained in the opinion fields 136 of the node activation data structures 120 of the node activations of the succeeding join nodes 33($i$+1) to determine if they are both less than the sum of (a) the larger of the beta opinion values for the node activations of the join nodes 33($i$) and (b) the value of parameter PARAM<GOOD—BETA—DELTA>. If the beta decision rule D6 fires, the operations described above in connection with beta decision rule D1 are performed in connection with the node activation data structure 120 of the node activation of the join node 33($i$) which has the higher beta opinion value.

It will be appreciated by those skilled in the art that, while the beta-token partitioning expert system has been described as comprising a plurality of production rules as elements for generating beta partitioning opinion values and beta partitioning decision values, the beta partitioning expert system may also be implemented in a functional or procedural manner using functional or procedural routines as elements for providing such values. Further, in the beta-token partitioning expert system comprising a plurality of production rules, the node activation data structures 120 and rule data structures 150 may comprise working memory elements in the formats used by the beta-partitioning opinion rules H1 through H13 and the beta decision rules D1 through D6.

Rule Partitioning System

For purposes of rule partitioning, the step of compiling the target expert system program to run on a single processor (see Step 100 in FIG. 3A) generates a RETE network in which join nodes 33 (FIG. 2) may be shared among multiple rules. The principle of node sharing will be explained with the aid of FIGS. 4A and 4B, which show, in schematic form, portions 108 of the RETE network corresponding to the nodes for the left hand sides of three rules defined as follows:

Rule A: $(TC_1)AND(TC_2)AND(TC_3)AND(TC_4)AND(TC_5)AND(TC_6)$
Rule B: $(TC_1)AND(TC_2)AND(TC_3)AND(TC_7)AND(TC_8)$
Rule C: $(TC_1)AND(TC_2)AND(TC_3)AND(TC_4)AND(TC_9)$ where $TC_i$, $1 \leq i \leq 9$, represent test conditions (corresponding to conditions 21 of FIG. 2) and the AND's represent a logical connectors (corresponding to logical connectors 25 also of FIG. 2). In FIGS. 4A and 4B, the test conditions are represented as test nodes 110 (corresponding to test nodes 32 of FIG. 2) and the logical connectors are represented as join nodes 112 (corresponding to join nodes 33 in FIG. 2). Note that Rules A and B have identical strings of test conditions and logical connectors up to and including test condition $TC_3$ and its corresponding join node 112 (i.e., the join node 112 to which test node 110 labelled $TC_3$ is connected) and Rules A and C have identical strings of test conditions and logical connectors up to and including test condition $TC_4$ and its corresponding join node 112 (i.e., the join node 112 to which test node 110 labelled $TC_4$ is connected). In accordance with node sharing, the compiler enables the generation of only one data structure corresponding to a set of test nodes 110 and join nodes 112 shared by multiple rules. Then, as depicted in FIG. 4B, the complex tokens which issue in response to processing of that data structure are used for all of the rules that share the nodes in a set. For example, the data structure for the segment of Rule A corresponding to test conditions $TC_1$ through $TC_3$ appears only once in the compiled RETE network and during processing, complex tokens $CT_1$ are generated for Rule A as well as Rule B, both of which share those nodes.

During the compilation step, the processor performing the compilation operation identifies the nodes which are candidates for node sharing as follows. Taking one rule at a time, the processor processes each rule to generate a corresponding data structure 108. After a data structure 108 has been generated for a rule and before the data structure for the next rule is generated, the processor identifies the longest sequence of nodes 112 within the data structure 108 that may be shared with at least one of the other rules that have been compiled thus far. The identification of the longest shared node sequence proceeds in stages. In the first stage, the processor identifies all other rules among the rules compiled thus far which have a first test node that is identical to a corresponding test node of the rule being processed. Then, among the identified rules, the processor identifies all previously compiled rules which have a second test node and an associated join node (i.e., the test node 110 that is connected to join node 112) that are identical to the corresponding nodes of the rule being processed. This is repeated down through the test nodes 110 and join nodes 112 which make up data structure 108 of the rule being processed, one level at a time, until a level is reached at which the processor can find no rules which have test nodes 110 or join nodes 112 that are identical to those of the rule being processed. The sequence of join nodes 112 (and associated test nodes 108) down to the immediately prior level represents the longest sequence of shared nodes for the rule being processed. This series of operations is repeated for each data structure for each rule.

Also, during the compilation step, a mapping that identifies the join nodes 112 corresponding to each particular rule of all the rules to be rule partitioned is generated and stored in a lookaside table 160, such as the one illustrated in FIG. 5. Only the rules deemed unsuitable for beta partitioning (see step 102 of FIG. 3A) are included in the group of rules to be rule partitioned. Lookaside table 160 includes a sufficient number of blocks 162 to represent all of the rules in the target expert system program that are being rule partitioned. Each block 162 includes a rule identifier field 164, a mapping field 166, a total time field 168 and a partition identifier field 170. Each rule for which a mapping is generated is identified in rule identifier field 164 and a list identifying the join nodes which make up that rule is stored in the mapping field 166.

In the described embodiment, the processor accomplishes this mapping by first grouping join nodes 112 into what shall be referred to as $\mu$-blocks 114 and then mapping the $\mu$-blocks to the rules (that is, identifying, for each rule its component $\mu$-blocks) in lookaside table 160. Each $\mu$-block 114 is the longest sequence of connected join nodes 112 that can be constructed without violating the rule that all nodes of any given $\mu$-block 114 must be shared by all members of a set of rules. Thus, in FIG. 4B for example, join nodes 112 numbered 1 and 2 are members of the same $\mu$-block 114, namely, $\mu_1$, because they are part of a sequence and they are each shared by all members of a set of rules, namely, Rules A, B and C. Join node 112 numbered 3, however, cannot be a member of $\mu_1$ because it is not shared by the same set of rules (it is shared only by Rules A and C). All join nodes 112 are assigned to a corresponding numbered $\mu$-block 114 in accordance with these criteria. FIG. 4B depicts a set of $\mu$-blocks 114, namely, $\mu_1$ through $\mu_5$, which are constructed in accordance with such rules.

The mapping of join nodes 112 to the corresponding $\mu$-blocks 114 is retained for subsequent computations which take place during the running of the compiled target program on the single processor. As shall become more apparent, grouping join nodes 112 into $\mu$-blocks 114 reduces the amount of computations required to perform the rule partitioning in accordance with the invention.

When the target program is executed on the single processor, an execution trace of the program is generated and for each recognize-act cycle of the target program an effect set, $e_i$, is generated and stored in an effect set array 172, which organized as illustrated in FIG. 6. Each effect set can be expressed in the following form:

$$e_i = ((\mu_1, t_{i1})(\mu_2, t_{i2}) \ldots (\mu_m, t_{im})),$$

where
$e_i$ is the effect set for the $i^{th}$ recognize-act cycle;

i is an integer index identifying a recognize-act cycle and which ranges from 1 to P, where P equals the number of recognize-act cycles in the execution sequence;

$\mu_j$ identifies the $j^{th}$ $\mu$-block;

$t_{ij}$ is a measure of the time the program spent in processing the $j^{th}$ $\mu$-block during the $i^{th}$ cycle; and m is the total number of $\mu$-blocks used to describe the network.

Each entry 174 (namely, $t_{ij}$) of array 172 is indexed by the recognize-act cycle (i) and the $\mu$-block 114 ($\mu_j$) to which it corresponds. After the target program has been executed, effect set array 172 contains data for each of P cycles of the execution run.

After effect set data for all of the relevant cycles has been computed and stored in array 172, a measure of the total time spent (represented in FIG. 6 as $S_j$, $1 \leq j \leq m$) in processing each $\mu$-block 114 for all cycles of the program is computed and is then also stored in array 172. In other words, $S_j = \Sigma_i t_{ij}$.

In one embodiment, the measure of the time spent in processing each $\mu$-block 114 during a recognize-act cycle, namely, $t_{ij}$, is estimated by computing for that cycle the total number of activations for all of the join nodes which make up the relevant $\mu$-block. The activation counts required for that computation are available from the node activation data structures 120, (FIG. 3B-1) corresponding to alpha and beta memories 36 and 37 of the relevant join nodes 33 (see FIG. 2). In particular, the per cycle (as well as total) activation counts are derived from the data stored in total activation fields 126 and maximum activations fields 131 of the node activation data structures 120 for the mode activation of the relevant join nodes 33.

Alternatively, a hardware clock may be queried upon each token's entry and completion in a node, the elapsed processing time between entry and exit and completion in a node being accumulated for each recognize-act cycle. In that case, the actual per-cycle elapsed times may be stored in array 172 directly.

After the $S_j$'s are computed for all of $\mu$-blocks 114, the processor computes the total time spent in each rule for all of the cycles of the program and stores this in the appropriate total time field 168 in lookaside table 160. The total time for a rule, $T_{rule}$, is the sum of the total times for the $\mu$-blocks 114 which make up the rule. For example, as shown in FIG. 5, Rule A consists of three $\mu$-blocks 114, namely, $\mu_1$, $\mu_2$, and $\mu_3$; thus, $T_A = S_1 + S_2 + S_3$.

Figure 7A:
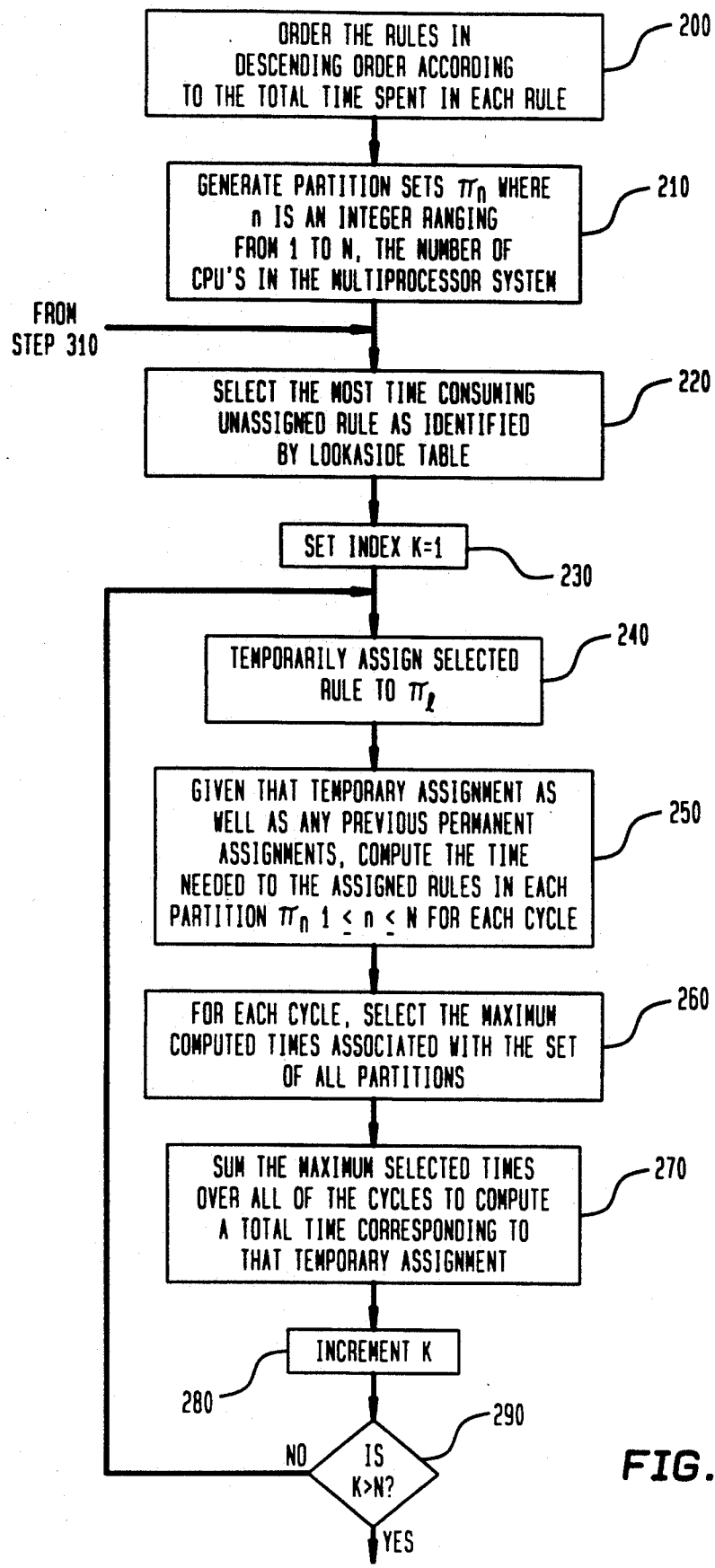
FIGS. 7A and 7B depict a flow chart describing the operation of rule partitioning in accordance with the invention.
Figure 7B:
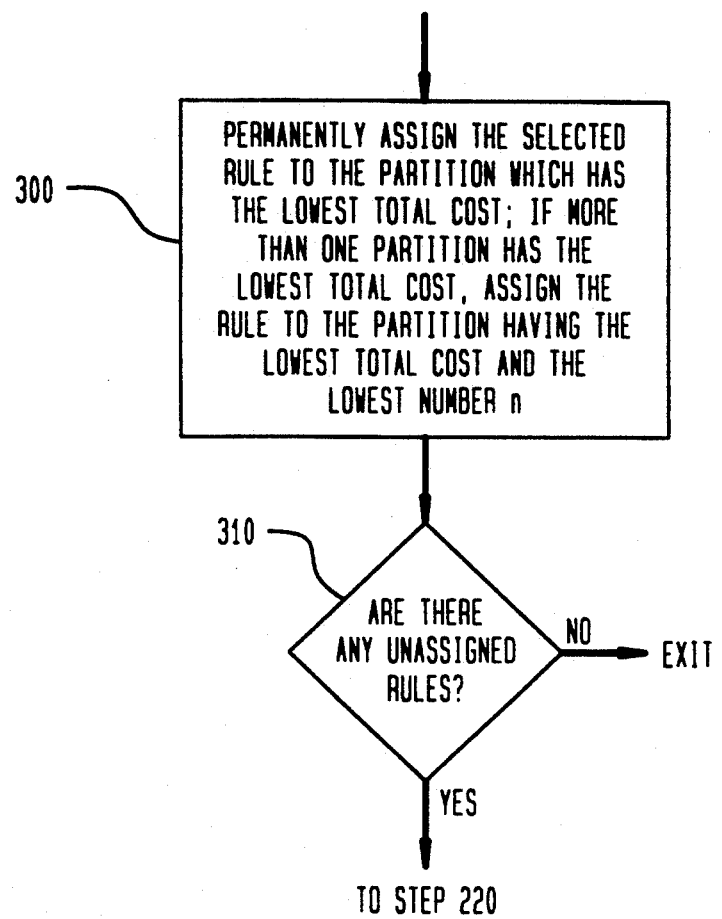

The statistics stored in tables 160 and 172 are subsequently used by a rule partition system (referred to hereinafter as the RP system) to distribute the processing of the rules among the processors of a multiprocessor system by assigning different rules to different processors (see step 104 of FIG. 3A). As shown in FIGS. 7A and 7B, the RP system initially rearranges the order of the rules listed in lookaside table 160 so that they are in descending order according to $T_{rule}$, that is, the total time spent on processing each rule, with the most time consuming rule (i.e., the rule associated with the block 162 having the highest value in its total time field 168) being listed first in table 160 (step 200). Then, the RP system generates a group of empty partition sets, $\pi_n 1 \leq n \leq N$, where N is specified by an operator and equals the number of central processing units (CPU's) in the multiprocessor system for which the target expert system program is being rule partitioned (step 210).

Briefly, after the partition sets have been generated, the RP system, for each of the target expert system rules identified in table 160, iteratively performs a series of operations to determine a partition to which the rule should be permanently assigned. During each iteration, the RP system selects a rule and temporarily assigns it to a partition and determines processing times for all of the partitions.

That is, for the partition to which the selected rule has been temporarily assigned, the RP system determines a partition processing time, which relates to the time required to process all rules, if any, which have previously been permanently assigned to the partition, as described below, as well as the rule which is temporarily assigned to the partition. In addition, for each of the partitions to which the rule has not been temporarily assigned, the RP system also determines a partition processing time, which relates to the total time required to process all rules which have previously been permanently assigned to those partitions. The RP system then determines the largest of the partition processing times, which corresponds to the time required to process the target expert system rules assuming the selected rule has been assigned to the one partition (that is, the particular partition to which it was temporarily assigned) as described above. If the RP system has processing times for multiple processing cycles, it does these operations separately for each of the cycles to determine the largest partition processing time over all of the processing cycles.

The RP system iteratively performs these operations to determine the total processing time for each temporary assignment of the selected rule to each partition. Thereafter, it determines the partition having the lowest total processing time, and permanently assigns the rule to that partition. The RP system repeats these iterative operations for each rule identified in table 160, until all of the rules have been assigned to partitions. By these operations, the RP system can determine the assignments of the rules to the various partitions to provide near optimum total processing time for all the rules in the target expert system program that are to undergo rule partitioning.

More specifically, the RP system initially selects the most time consuming rule among the unassigned rules listed in lookaside table 160 (i.e., the rule with the largest $T_{rule}$) (step 220). During processing, the RP system iteratively selects the rules in the order they are listed in the table. After selecting a rule, the RP system initializes an index, k, by setting it equal to one (step 230). The index is used to identify the particular partition $\pi_k$ to which the rule is being assigned, and also to determine when the rule has been assigned to all partitions, at which point iterations for that rule stop. Next, after initializing the index k, the RP system temporarily assigns the selected rule to partition $\pi_k$, i.e., the partition identified by the index k (step 240). Based upon this temporary assignment, the RP system computes, for each partition and for each cycle of the program, the time, as determined from array 172, for processing the rules (including the temporarily-assigned rule as well as rules, if any, which were previously permanently assigned to the partition) assigned to the respective partitions (step 250). These process times are derived from the information stored in lookaside table 160, which identifies the $\mu$-blocks assigned to each rule of the target expert system program, and effect data array 172, which lists the time to process each μ-block for each cycle of the target expert system program.

For example, assuming there are two CPU's (and, thus, two partitions, namely $\pi_1$, and $\pi_2$) and assuming Rule A is the most time consuming rule (i.e., the rule taking the longest processing time and thus is the first rule to be selected), during the first iteration Rule A is temporarily assigned to partition $\pi_1$. Since Rule A includes μ-blocks, $\mu_1$, $\mu_2$, and $\mu_3$, and the recorded time for each μ-block is $t_{ij}$ in array 172, the computed process times associated with each partition and for each of three cycles for which it has processing times (given the temporary assignment of Rule A to partition $\pi_1$) are as follows:

| cycle | $\pi_1$ | $\pi_2$ |
|---|---|---|
| 1 | $t_{11} + t_{12} + t_{13}$ | 0 |
| 2 | $t_{21} + t_{22} + t_{23}$ | 0 |
| 3 | $t_{31} + t_{32} + t_{33}$ | 0 |

Since all CPU's must complete processing of rules in its partition during one cycle before any CPU can begin processing the rules for the next cycle, the partition with the maximum processing time for a given cycle establishes the minimum processing time required for all of the CPU's during that cycle. Otherwise stated, the maximum processing time for all CPU's to process their assigned rules during a cycle corresponds to the minimum processing time over that cycle. For notational purposes, in the following description, for a temporary assignment of Rule X to a partition $\pi_k$, the minimum amount of time required for a processor to process a cycle i will be designated as $MT_i(x \rightarrow k)$. In step 260, the RP system determines the value for $MT_i(x \rightarrow k)$ for each cycle by identifying the maximum processing time among all of the computed partition processing times for that cycle. Thus, since the processing times for partition $\pi_2$ are all zeros, the minimum processing time for each cycle is determined by the processing times for partition $\pi_1$; that is:

$$MT_1(A \rightarrow 1) = t_{11} + t_{12} + t_{13}$$

$$MT_2(A \rightarrow 1) = t_{21} + t_{22} + t_{23}$$

$$MT_3(A \rightarrow 1) = t_{31} + t_{32} + t_{33}$$

Next, the RP system computes a total program processing time for the temporary assignment of rule x to partition $\pi_k$, which is designated as $TOT(x \rightarrow k)$, by summing the minimum cycle processing times over all of the cycles (step 270). That is, $$TOT(x \rightarrow k) = \Sigma_i MT_i(x \rightarrow k).$$

Thus, if there are only three cycles, then:

$$TOT(A \rightarrow 1) = t_{11} + t_{12} + t_{13} + t_{21} + t_{22} + t_{23} + t_{31} + t_{32} + t_{33}$$

The resulting value for $TOT(x \rightarrow k)$ is temporarily stored until a permanent assignment for the selected rule has been determined.

After the RP system has determined the total program processing time associated with assigning the selected rule to $\pi_k$, where k=1, it increments k (step 280) and then tests k to determine if it is greater than N, the number of partitions (step 290). If k is not greater than N, the RP system returns to step 240 to repeat steps 240, 250, 260 and 270 to temporarily assign the selected rule to partition $\pi_k$, in this case partition $\pi_2$, to generate, in step 290, a total program processing time for that temporary assignment, namely, $TOT(A \rightarrow 2)$. That is, the computed processing times associated with each partition and for each cycle of the program (given the temporary assignment of Rule A to partition $\pi_2$) are as follows:

| cycle | $\pi_1$ | $\pi_2$ |
|---|---|---|
| 1 | 0 | $t_{11} + t_{12} + t_{13}$ |
| 2 | 0 | $t_{21} + t_{22} + t_{23}$ |
| 3 | 0 | $t_{31} + t_{32} + t_{33}$ |

It will be appreciated that these times are, for each cycle, identical to the processing times which were determined above for assignment of Rule A to partition $\pi_1$, and the total program processing time, $TOT(A \rightarrow 2)$, will also be identical.

Steps 240 through 270 are interatively repeated for each value of k until the selected rule has been assigned to each partition and a value for the total program processing time $TOT(x \rightarrow k)$ has been computed for each such assignment. At that point, the value for k in step 290 will be greater than N and the RP system will sequence to step 300.

By the time the RP system has sequenced to stop 300 it has determined total program processing times for the temporary assignment of the selected rule to the various partitions. In step 300, the RP system identifies the partition assignment of the selected rule that yielded the lowest total program processing time and permanently assigns the selected rule to that partition. The permanent assignment of the rule to a partition is then recorded in the corresponding partition assignment field 170 of lookaside table 160 (see FIG. 5) of block 162 for the rule. If more than one temporary partition assignment $\pi_k$ for the selected rule have the same lowest total program processing time, as will be the case for the first rule in table 160, the RP system assigns the selected rule to the partition $\pi_k$ having both the lowest total program processing time and the lowest index number, k. Since Rule A is the first rule to be selected and no other rules have yet been permanently assigned to any partition $\pi_k$, the RP system will determine the same processing time for both partition $\pi_1$ and partition $\pi_2$. Thus, Rule A will be assigned to partition $\pi_1$.

After the first selected rule is assigned to a partition, the RP system determines whether there are any other rules which have not been assigned to partitions $\pi_k$ (step 310). If the RP system determines that there are no other rules which have not been assigned, it exits and the rule partitioning is completed. However, if table 160 includes other rules which have not been assigned to a partition $\pi_k$, the RP system branches back to step 220 in which it selects the next rule, which is the next most time consuming unassigned rule and repeats the above-described steps to determine a permanent assignment for that rule.

In determining the processing times for the temporary assignments in each iteration (step 250), the RP system takes into account when nodes are shared among rules. This will be illustrated by the following discussion of the processing of Rule B by the RP system. For example, continuing with arrangement depicted in FIG.

5, if it is assumed that Rule B is the second most time consuming rule in table 160, then during the first iteration of processing Rule B, Rule B is first temporarily assigned to $\pi_1$, to which, as described above, Rule A has been permanently assigned. Given this temporary assignment, the computed process times associated with each partition for the first three cycles of the program are:

| cycle | $\pi_1$ | $\pi_2$ |
|---|---|---|
| 1 | $t_{11} + t_{12} + t_{13} + t_{14}$ | 0 |
| 2 | $t_{21} + t_{22} + t_{23} + t_{24}$ | 0 |
| 3 | $t_{31} + t_{32} + t_{33} + t_{34}$ | 0 |

Note that since Rule A and Rule B both share $\mu$-block $\mu_1$, the time associated with that $\mu$-block, namely, $t_{11}$, is only included once in the computations.

For the next iteration of the loop including steps 240 through 290 (i.e., for k=2), Rule B is temporarily assigned to partition $\pi_2$, and the computed process times associated with each partition and for the first three cycles of the program are:

| cycle | $\pi_1$ | $\pi_2$ |
|---|---|---|
| 1 | $t_{11} + t_{12} + t_{13}$ | $t_{11} + t_{14}$ |
| 2 | $t_{21} + t_{22} + t_{23}$ | $t_{21} + t_{24}$ |
| 3 | $t_{31} + t_{32} + t_{33}$ | $t_{31} + t_{34}$ |

In this iteration, the times depicted for partition $\pi_1$ comprise the times for processing Rule A, which has been permanently assigned to that partition. In this example, it should be readily apparent that, regardless of the actual values for $t_{ij}$, Rule B will be permanently assigned to partition $\pi_2$ since that partition has not yet had any rules permanently assigned to it. The total processing time associated with assigning Rule B to partition $\pi_2$, given that Rule A has already been permanently assigned to partition $\pi_1$, must be less than the alternative of also assigning Rule B to partition $\pi_1$.

The benefits of node sharing become more apparent when deciding how to assign rules after each partition has at least one rule already permanently assigned to it. Continuing with the above example and assuming that Rule C is the next most time consuming rule after Rule B, it is first temporarily assigned to partition $\pi_1$ (step 240 for k=1). Then, in step 250, the processing times for each partition and for each cycle are computed to be:

| cycle | $\pi_1$ | $\pi_2$ |
|---|---|---|
| 1 | $t_{11} + t_{12} + t_{13} + t_{15}$ | $t_{11} + t_{14}$ |
| 2 | $t_{21} + t_{22} + t_{23} + t_{25}$ | $t_{21} + t_{24}$ |
| 3 | $t_{31} + t_{32} + t_{33} + t_{35}$ | $t_{31} + t_{34}$ |

Note that these times assume that Rules A and B have been permanently assigned to partitions $\pi_1$ and $\pi_2$, respectively, during earlier operations. Also note the impact of node sharing on the values for partition $\pi_1$. Since Rules A and C share $\mu$-blocks $\mu_1$ and $\mu_2$, the processing times for those $\mu$-blocks are counted only once when computing the processing times for the rules assigned to partition $\pi_1$.

Next and in accordance with step 260, the resulting minimum processing times for each cycle, given the temporary assignment of Rule C to partition $\pi_1$ are computed to be:

$$MT_1(C \rightarrow 1) = MAX[t_{11} + t_{12} + t_{13} + t_{15}, t_{11} + t_{14}]$$

$$MT_2(C \rightarrow 1) = MAX[t_{21} + t_{22} + t_{23} + t_{25}, t_{21} + t_{24}]$$

$$MT_3(C \rightarrow 1) = MAX[t_{31} + t_{32} + t_{33} + t_{35}, t_{31} + t_{34}]$$

where MAX[x,y] signifies taking the larger of the two quantities x and y. And, finally in step 270, the total program processing time is computed to be $TOT(C \rightarrow 1) = \Sigma\ MT_i(C \rightarrow 1)$.

For the next iteration of steps 240 through 290 (k=2), Rule C is temporarily assigned to partition $\pi_2$ (while, as before, Rules A and B are still permanently assigned to partitions $\pi_1$ and $\pi_2$, respectively). This time, in step 250, the processing times for each partition and for each cycle are computed to be:

| cycle | $\pi_1$ | $\pi_2$ |
|---|---|---|
| 1 | $t_{11} + t_{12} + t_{13}$ | $t_{11} + t_{12} + t_{14} + t_{15}$ |
| 2 | $t_{21} + t_{22} + t_{23}$ | $t_{21} + t_{22} + t_{24} + t_{25}$ |
| 3 | $t_{31} + t_{32} + t_{33}$ | $t_{31} + t_{32} + t_{32} + t_{35}$ |

Again, note the impact of node sharing on the values for partition $\pi_2$. Since Rules B and C share $\mu$-block $\mu_1$, the processing times for that $\mu$-block is counted only once when computing the processing times for the rules assigned to partition $\pi_2$.

In step 260, the resulting minimum processing times for each cycle, given the temporary assignment of Rule C to partition $\pi_2$ are computed to be:

$$MT_1(C \rightarrow 2) = MAX[t_{11} + t_{12} + t_{13}, t_{11} + t_{12} + t_{14} + t_{15}]$$

$$MT_2(C \rightarrow 2) = MAX[t_{21} + t_{22} + t_{23}, t_{21} + t_{22} + t_{24} + t_{25}]$$

$$MT_3(C \rightarrow 2) = MAX[t_{31} + t_{32} + t_{33}, t_{31} + t_{32} + t_{34} + t_{35}].$$

And, in step 270, the total program processing time is computed to be $TOT(C \rightarrow 2) = \Sigma\ MT_i(C \rightarrow 2)$.

Finally, in step 300, Rule C is permanently assigned to the partition which yields the smallest $TOT(x \rightarrow k)$. These operations are repeated for each of the rules in table 160.

It should be readily apparent that by using the node sharing a substantial savings in total program processing times can be achieved in those cases where the number of rules exceeds the number of CPU's, which is typically the situation. Also, it should be understood that use of the above-described rule partitioning does not necessarily require the prior use of beta partitioning.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A system for building a reticular discrimination network (RETE network) capable of being partitioned across a set of multiple, interconnected computer processors that comprise a computer system, from at least a portion of a target expert system, the target expert system comprising a plurality of rules each of which comprise a plurality of conditions grouped in a sequence by a set of logical connectors and a result to occur when the conditions of the rule are satisfied, certain ones of the plurality of rules having conditions that are equivalent to conditions in other ones of the plurality of rules, each of the conditions in a rule being represented by a test node in the reticular discrimination network, the test nodes being connected through associated join nodes representing the logical connectors of the rule, the system for building a RETE network comprising:
   a. a memory configured to store the target expert system;
   b. a partitioner, coupled to the memory and configured to read each condition of each rule of the at least a portion of the target expert system, and partition the rules by associating each rule into one of a preselected set of partitions and storing partition information relating to the partitions in the memory, each partition representing one of the multiple, interconnected computer processors comprising the computer system, the partitioner including means to identify conditions shared by more than one rule and means to increase the likelihood that a first and second rule will be associated into a same one of the preselected set of partitions when the first and second rules share any of certain ones of the plurality of conditions; and
   c. a compiler configured to convert the rules of the at least a portion of the target expert system into a RETE network, each partitioned rule being compiled to execute on a corresponding processor based on the partition information.

2. In the system as defined in claim 1 the partitioner comprises:
   a. an iteration module coupled to the memory and configured to read a rule and temporarily assign the rule to each of the different partitions;
   b. an evaluation module for estimating a performance measure for each such temporary assignment of the rule, the performance measure being derived from predetermined processing statistics and condition sharing information; and
   c. an assignment module for permanently assigning the rule to the partition which yields the best performance measure.

3. In the system as defined in claim 2 the iteration module operates to temporarily assign the rules in an order by selecting for temporary assignment an unassigned rule which has a longest processing time according to the predetermined processing statistics.

4. The system of claim 2 further comprising a statistics generating module for generating the predetermined processing statistics.

5. In the system of claim 4 the evaluation module comprises means for calculating, as a function of the predetermined processing statistics and the condition sharing information, the time for the multiple processors to complete at least one recognize/act cycle for the target expert system with the rule as temporarily assigned.

6. In the system of claim 5 the means for calculating the time to complete at least one recognize/act cycle for the target expert system with the rule as temporarily assigned comprises means for computing a partition process time for each partition for each recognize/act cycle.

7. In the system of claim 6 the means for summing the number of activations in each cycle of each of the nodes representing the rules that are assigned to that partition comprises a means for including the number of activations of nodes that are part of conditions that are shared by more than one rule assigned to that partition in sums only once.

8. In the system of claim 5 the statistics generating module comprises means for generating the numbers of activations per recognize/act cycle for blocks of test and join nodes representing sequences of conditions shared by rules in the target expert system.

9. In the system of claim 8 the means for calculating the time to complete at least one recognize/act cycle for the target expert system with the rule as temporarily assigned comprises means for computing a partition process time for each partition for each recognize/act cycle.

10. In the system of claim 9 the means for computing the partition process time for each partition for each recognize/act cycle comprises means for summing the number of activations in each cycle of each of the blocks representing the rules that are assigned to that partition.

11. In the system of claim 10, the means for summing comprises means for including the number of activations of blocks that are shared by more than one rule in the partition in sums only once.

12. In the system of claim 6 the means for calculating the time to complete at least one recognize/act cycle for the target expert system with the rule as temporarily assigned comprises means for identifying the largest partition process time for each recognize/act cycle and summing the identified largest process times.

13. In the system of claim 6, the statistics generating module comprises means for generating the number of activations of conditions per recognize/act cycle for rules of the target expert system from runs of the target expert system.

14. In the system of claim 13, the means for computing the partition process time for each partition for each recognize/act cycle comprises means for summing the number of activations in each cycle of each of the nodes representing the rules that are assigned to that partition.

15. In the system of claim 1, the partitioner comprises means for enhancing the likelihood that the first and second rules will be associated into the same partition whenever the first and second rules share any of the plurality of conditions.

16. A system for building a reticular discrimination network (RETE network) capable of being partitioned across a set of multiple, interconnected computer processors that comprise a computer system, from at least a portion of a target expert system program, the target expert system program comprising a plurality of rules, each of which comprise a plurality of conditions grouped in a sequence by a set of logical connectors and a result to occur when the conditions of the rule are satisfied, certain ones of the plurality of rules having conditions that are equivalent to conditions in other ones of the plurality of rules, each of the conditions in a rule being represented by a test node in the RETE network, the test nodes being connected through associated join nodes representing the logical connectors of the rule, the system for building a RETE network comprising:
   a. a memory configured to store the target expert system program;
   b. a uniprocessor compiler coupled to the memory and configured to compile the target expert system program to form a RETE network for execution on a single processor and store the compiled target expert system program in the memory, certain ones of the conditions represented by nodes of the uniprocessor RETE network being shared by more than one rule;

c. a processor, coupled to the memory for executing the target expert system program, to obtain processing statistics in connection with each node of the uniprocessor RETE network during execution;

d. a partitioner, coupled to the memory and configured to read each condition of each rule of at least a portion of the target expert system program, and partition by associating each rule into one of a preselected set of partitions, and store partition information relating to the partitioning in the memory, each partition representing one of the multiple processors comprising the computer system, the partitioning performed in a manner to identify conditions shared by more than one rule and partition the rules as a function of the identified shared conditions and the processing statistics; and e. a compiler, coupled to the memory and configured to convert the rules of the at least portion of the target expert system program into a RETE network, each partitioned rule being compiled to execute on a corresponding processor based on the partition information.

17. The system of claim 16 wherein the partitioner configured to partition the rules of the target expert system program comprises:

a. an iteration module coupled to the memory configured to read the conditions comprising a rule for temporarily assigning a rule to each of the different partitions;

b. an evaluation module for estimating a performance measure for each such temporary assignment of the rule, the performance measure being derived from the processing statistics and condition sharing information; and c. an assignment module for permanently assigning the rule to the partition which yields the best performance measure.

18. The system as defined in claim 17 wherein the iteration module operates to temporarily assign the rules in an order by selecting for temporary assignment an unassigned rule which has a longest processing time according to the processing statistics.

19. The system of claim 18 further comprising a statistics generating module for generating the processing statistics.

20. In the system of claim 19 the evaluation module comprises means for calculating, as a function of the processing statistics and the condition sharing information, the time for the multiple processors to complete at least one recognize/act cycle for the target expert system program with the rule as temporarily assigned.

21. In the system of claim 20 the means for calculating the time to complete at least one recognize/act cycle for the target expert system program with the rule as temporarily assigned comprises means for computing a partition process time for each partition for each recognize/act cycle.

22. In the system of claim 21 the means for summing the number of activations in each cycle of each of the nodes representing the rules that are assigned to that partition comprises means for including the number of activations of nodes that are part of conditions that are shared by more than one rule assigned to that partition in sums only once.

23. In the system of claim 20 the statistics generating module comprises means for generating the numbers of activations per recognize/act cycle for blocks of test and join nodes representing sequences of conditions shared by rules in the target expert system program.

24. In the system of claim 23 the means for calculating the time to complete at least one recognize/act cycle for the target expert system program with the rule as temporarily assigned comprises means for computing a partition process time for each partition for each recognize/act cycle.

25. In the system of claim 24 the means for computing the partition process time for each partition for each recognize/act cycle comprises means for summing the number of activations in each cycle of each of the blocks representing the rules that are assigned to that partition.

26. In the system of claim 21 the means for calculating the time to complete at least one recognize/act cycle for the target expert system program with the rule as temporarily assigned comprises means for identifying the largest partition process time for each recognize/act cycle and summing the identified largest process times.

27. In the system of claim 21, the statistics generating module comprises means for generating the number of activations of conditions per recognize/act cycle for rules of the target expert system program from runs of the target expert system program.

28. In the system of claim 27, the means for computing the partition process time for each partition for each recognize/act cycle comprises means for summing the number of activations in each cycle of each of the nodes representing the rules assigned to that partition.

29. In the system of claim 16, the partitioner comprises means for enhancing the likelihood that the first and second rules will be associated into the same partition whenever the first and second rules share any of certain ones of the plurality of conditions.

30. In the system of claim 16, the partitioner comprises means for enhancing the likelihood that the first and second rules will be associated into the same partition whenever the first and second rules share any of the plurality of conditions.

31. A method for building a reticular discrimination network (RETE network) capable of being partitioned across a set of multiple, interconnected computer processors that comprise a computer system, from at least a portion of a target expert system program, the target expert system program comprising a plurality rules each of which comprise a plurality of conditions, grouped in a sequence by a set of logical connectors, and a result to occur when the conditions of the rule are satisfied, certain ones of the plurality of rules having conditions that are equivalent to conditions in other ones of the plurality of rules, each of the conditions in the a rule being represented by a test node in the reticular discrimination net, the test nodes being connected through associated join nodes representing the logical connectors of the rule, the method comprising the steps of:

a. storing the target expert system program in memory;

b. compiling the target expert system program to form a RETE network for execution on a single processor;

c. executing the target expert system program on a single processor;
d. obtaining processing statistics in connection with each node of the RETE network during execution of the target expert system program;
e. partitioning each rule of at least a portion of the target expert system program by reading each condition of each rule from the memory and associating each rule into one of a preselected set of partitions, each partition representing one of the multiple processors comprising the computer system, the partitioning performed in a manner to identify conditions shared by more than one rule and partition the rules as a function of the identified shared conditions and the processing statistics;
f. storing partition information relating to the partitioning in the memory; and
g. compiling the at least a portion of the target expert system program by converting the rules of the target expert system program into a RETE network, each partitioned rule being compiled to execute on a corresponding processor based on the partitioning information.

32. In the method of claim 31 the rule partitioning step comprises the steps of:
a. selecting a rule from the memory;
b. temporarily assigning, by temporary association, the rule selected to each of the different partitions;
c. estimating a performance measure for each such temporary assignment of the selected rule, the performance measure being derived from the processing statistics and condition sharing information; and
d. assigning permanently the selected rule to the partition which yields a best performance measure.

33. In the method of claim 32 the step of selecting a rule comprises the further step of selecting rules in an order by selecting for temporary assignment a rule that has yet to be assigned and which has a longest processing time according to the processing statistics.

34. In the method of claim 33 the step of obtaining processing statistics comprises obtaining the number of activations of conditions per recognize/act cycle for rules of the target expert system program.

35. The method of claim 34 wherein the performance measure is determined by the further step of calculating the time it would take for the multiple processors to complete at least one recognize/act cycle for the target expert system with the rule as temporarily assigned, the calculation being determined as a function of the processing statistics and condition sharing information.

36. The method of claim 35 wherein in the step of calculating the time to complete at least one recognize/act cycle is derived by computing a partition process time for each partition during each recognize/act cycle, the partition process time being computed by summing the number of activations for each of the nodes which make up the rules that are assigned to that partition.

37. The method of claim 36 wherein the calculation step to calculate the time to complete at least one recognize/act cycle is derived by adding, for each condition, the number of activations per recognize/act cycle only once, when that condition is shared by multiple rules assigned to that partition.

38. In the method of claim 34 the step of obtaining processing statistics further comprises obtaining the numbers of activations per recognize/act cycle for blocks of test and join nodes representing sequences of conditions shared by rules in the target expert system program.

39. The method of claim 38 wherein the step of calculating the time to complete at least one recognize/act cycle is derived by computing a partition process time of each partition during each recognize/act cycle, the partition process time being computed as a function of the sum of the number of activations of each shared block of condition sequences.

40. The method of claim 39 wherein the step of calculating the time to complete at least one recognize/act cycle is derived by adding for each block of conditions its number of activations per recognize/act cycle only once, when that block is shared by more than one rule assigned to that partition.

41. The method of claim 36 wherein the step of calculating the time to complete at least one recognize/act cycle is derived by summing the largest partition process times for each recognize/act cycle over all recognize/act cycles.

42. In the method of claim 31, the step of partitioning comprises the step of enhancing the likelihood that the first and second rules will be associated into the same partition whenever the first and second rules share any of certain ones of the plurality of conditions.

43. In the method of claim 31, the step of partitioning comprises the step of enhancing the likelihood that the first and second rules will be associated into the same partition whenever the first and second rules share any of the plurality of conditions.

44. A method for building a reticular discrimination network (RETE network) capable of being partitioned across a set of multiple, interconnected computer processors that comprise a computer system, from at least a portion of a target expert system, the target expert system comprising a plurality of rules each of which comprise a plurality of conditions, grouped in a sequence by a set of logical connectors, and a result to occur when the conditions of the rule are satisfied, certain ones of the plurality of rules having conditions that are equivalent to conditions in other ones of the plurality of rules, each of the conditions in a rule being represented by a test node in the reticular discrimination network, the test nodes being connected through associated join nodes representing the logical connectors of the rule, the method comprising:
a. storing the target expert system in memory;
b. partitioning each rule of the at least a portion of the target expert system by associating each rule into one of a preselected set of partitions, each partition representing one of the multiple processors comprising the computer system, the partitioning step being performed in a manner to identify conditions shared by more than one rule, the partitioning step being further performed in manner to increase the likelihood that a first and second rule will be associated into a same one of the preselected set of partitions when the first and second rules share any of certain ones of the plurality of conditions;
c. storing the partition information in the memory; and
d. compiling the at least a portion of the target expert system in the memory to convert the rules of the target expert system into a RETE network, each partitioned rule being compiled to execute on a corresponding microprocessor based on the partition information.

45. In the method of claim 44, the step of partitioning comprises the step of enhancing the likelihood that the first and second rules will be associated into the same partition whenever the first and second rules share any of the plurality of conditions.

46. A system for building a reticular discrimination network (RETE network) capable of being partitioned across a set of multiple, interconnected computer processors that comprise a computer system, from at least a portion of a target expert system, the target expert system comprising a plurality of rules each of which comprise a plurality of conditions grouped in a sequence by a set of logical connectors and a result to occur when the conditions of the rule are satisfied, certain ones of the plurality of rules having conditions that are equivalent to conditions in other ones of the plurality of rules, each of the conditions in a rule being represented by a test node in the reticular discrimination net, the test nodes being connected through associated join nodes representing the logical connectors of the rule, the system for building a RETE network comprising:

a. a memory configured to store the target expert system;
  b. a partitioner, coupled to the memory and configured to read each condition of each rule of the at least a portion of the target expert system, and partition the rules by associating each rule into one of a preselected set of partitions and storing partition information relating to the partitions in the memory, each partition representing one of the multiple, interconnected computer processors comprising the computer system, the partitioning performed in a manner to identify conditions shared by more than one rule and partition the rules as a function of the identified shared conditions, the partitioner comprises:
     i. an iteration module coupled to the memory and configured to read a rule and temporarily assign the rule to each of the different partitions,
     ii. an evaluation module for estimating a performance measure for each such temporary assignment of the rule, the performance measure being derived from predetermined processing statistics and condition sharing information, and
     iii. an assignment module for permanently assigning the rule to the partition which yields the best performance measure; and
  d. a compiler configured to convert the rules of the at least a portion of the target expert system into a RETE network, each partitioned rule being compiled to execute on a corresponding processor based on the partition information.

* * * * *